(12) United States Patent
Cicerone et al.

(10) Patent No.: US 11,913,886 B2
(45) Date of Patent: Feb. 27, 2024

(54) LOW-ABERRATION HIGH-SPEED-COMPATIBLE OPTICAL DELAY LINES AND METHODS THEREOF

(71) Applicant: Georgia Tech Research Corporation, Atlanta, GA (US)

(72) Inventors: Marcus Cicerone, Atlanta, GA (US); Xavier Audier, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 141 days.

(21) Appl. No.: 17/619,630

(22) PCT Filed: Jun. 16, 2020

(86) PCT No.: PCT/US2020/037871
§ 371 (c)(1),
(2) Date: Dec. 16, 2021

(87) PCT Pub. No.: WO2020/257154
PCT Pub. Date: Dec. 24, 2020

(65) Prior Publication Data
US 2022/0299443 A1    Sep. 22, 2022

Related U.S. Application Data

(60) Provisional application No. 63/004,777, filed on Apr. 3, 2020, provisional application No. 62/862,598, filed on Jun. 17, 2019.

(51) Int. Cl.
*G01N 21/65* (2006.01)
*G02B 26/10* (2006.01)
*G02B 26/12* (2006.01)

(52) U.S. Cl.
CPC .......... *G01N 21/65* (2013.01); *G02B 26/105* (2013.01); *G02B 26/125* (2013.01); *G01N 2021/653* (2013.01); *G02B 2207/117* (2013.01)

(58) Field of Classification Search
CPC ............ G01N 21/65; G01N 2021/653; G02B 26/105; G02B 26/125; G02B 2207/117; G02B 26/06; G02B 5/10; G02B 26/12
See application file for complete search history.

(56) References Cited

U.S. PATENT DOCUMENTS 5,303,081 A * 4/1994 Totsuka ............... B23K 26/703
                                                    219/121.33
6,608,676 B1    8/2003 Zhao et al.
(Continued)

FOREIGN PATENT DOCUMENTS

WO    WO-2018118646 A1 *  6/2018 ................ G01J 3/10

OTHER PUBLICATIONS

International Search Report and Written Opinion from application No. PCT/US2020/037871 dated Oct. 28, 2020.

*Primary Examiner* — Tarifur R Chowdhury
*Assistant Examiner* — Akbar H. Rizvi
(74) *Attorney, Agent, or Firm* — Troutman Pepper Hamilton Sanders LLP; Ryan A. Schneider; Brandon M. Reed

(57) ABSTRACT

This disclosure describes an example architecture for providing a delay line for optical techniques. The delay line architecture includes a focusing element that has a focal axis disposed parallel to its length. The line of symmetry provided by the focal axis obviates path-length-dependent aberrations caused by the off-axis beam translations. The systems described herein also provide varying geometries of movable mirrors, including a galvanometer mirror and a rotating polygonal mirror. The systems and methods described herein also provide techniques for generating and detecting coherent Raman spectra using a picosecond probe pulse.

29 Claims, 19 Drawing Sheets

(56) References Cited

U.S. PATENT DOCUMENTS

| | | | |
|---|---|---|---|
| 7,643,212 B1 | 1/2010 | Sokoloff et al. | |
| 2003/0026582 A1* | 2/2003 | In' T Hout | G02B 6/358 385/140 |
| 2005/0018201 A1 | 1/2005 | De Boer et al. | |
| 2007/0009207 A1* | 1/2007 | Xu | G02B 6/4239 385/39 |
| 2007/0091400 A1* | 4/2007 | Dufour | G02B 17/023 359/211.2 |
| 2007/0252978 A1* | 11/2007 | Van Der Voort | G01N 21/65 356/300 |
| 2008/0059135 A1* | 3/2008 | Murugkar | G01J 3/4338 703/11 |
| 2008/0218762 A1* | 9/2008 | Zhao | G01N 21/9501 356/445 |
| 2011/0075150 A1 | 3/2011 | Mercer | |
| 2014/0226157 A1* | 8/2014 | Dogariu | G01J 3/4412 356/301 |
| 2014/0291524 A1* | 10/2014 | Kubota | G01N 21/3586 250/341.8 |
| 2015/0005641 A1* | 1/2015 | Toida | G01B 9/02091 600/476 |
| 2015/0380892 A1* | 12/2015 | Fermann | G01N 21/636 372/18 |
| 2017/0105618 A1 | 4/2017 | Schmoll et al. | |
| 2018/0226773 A1* | 8/2018 | Yun | G01B 9/02083 |

\* cited by examiner

LOW-ABERRATION HIGH-SPEED-COMPATIBLE OPTICAL DELAY LINES AND METHODS THEREOF

CROSS-REFERENCE TO RELATED APPLICATIONS

This application claims priority, and benefit under 35 U.S.C. § 119(e), to U.S. Provisional Patent Application Nos. 62/862,598, filed 17 Jun. 2019, and 63/004,777, filed 3 Apr. 2020, the entire contents of which are hereby incorporated by reference as if fully set forth below.

FIELD OF THE DISCLOSURE

Embodiments of the present disclosure relate generally to systems and methods for providing an optical delay line and, more particularly, to systems and methods for providing an optical delay line for use in optical techniques such as coherent anti-Stokes Raman scattering.

BACKGROUND

Many linear and non-linear optical methods such as interferometry and spectroscopy, such as pump-probe spectroscopy, require optical delay of one light path with respect to the other. Delay line performance requirements vary with application but are particularly demanding when dealing with broad spectral ranges and ultrafast pulses; especially if rapid scanning is necessary. The requirement of matched dispersion for the delayed and reference beam, encountered when working with very short pulses, generally requires a dispersionless free-space delay line. In such arrangements, optical paths are ordinarily mechanically modulated.

Mechanical path modulation is easily accomplished at low speed with linear motion of a reflecting mirror along the optical axis. Such arrangements introduce no significant aberrations, but they are limited in scan rate by inertial constraints on mirror acceleration. Repetition rate can be increased by replacing linear motion with oscillatory or rotational motion of a reflecting surface. These configurations, however, also suffer from various drawbacks, such as low duty factor, significant static wavefront distortion from uncompensated reflections at curved surfaces, difficulty in fabrication, or off-axis beam displacement.

These drawbacks are significant concerns for many optical techniques that require low aberrations and high scan rate. For example, in applications such as broadband Fourier-transform coherent anti-Stokes Raman scattering (FT-CARS), rapidly repeating, dispersion-free pulse delay on the order of several ps is desired. What is needed, therefore, are systems and methods that resolve the problems associated with low scan rate and high wavefront aberration. Ideally, such systems and methods can be implemented to improve fingerprint coherent Raman microscopy and other optical techniques.

SUMMARY

Embodiments of the present disclosure address these concerns as well as other needs that will become apparent upon reading the description below in conjunction with the drawings. Briefly described, embodiments of the present disclosure relate generally to systems and methods for providing an optical delay line and, more particularly, to systems and methods for providing an optical delay line for use in optical techniques such as coherent anti-Stokes Raman scattering and other coherent Raman methods.

An exemplary embodiment of the present invention provides a method for adjusting an optical path length. The method can include directing a first light field to a delay module. The delay module can include a movable mirror, a focusing optical element having a focal axis parallel to its length, and a return mirror. The method can include delaying the first light field via the delay module to create a delayed light field. The movable mirror can be configured to receive the first light field and reflect the first light field to the focusing optical element. The focusing optical element can be configured to receive the first light field reflected from the movable mirror and return the first light field to the return mirror. The return mirror can be configured to receive the first light field reflected from the focusing optical element and reflect the first light field back to the focusing optical element.

In any of the embodiments described herein, the movable mirror can be rotatable upon an axis. The movable mirror can be positioned such that the movable mirror intersects the focal axis of the focusing optical element. The return mirror can be positioned such that the return mirror intersects the focal axis of the focusing optical element. The first light field can approach the delay module along a line which is a linear combination of the axis of the movable mirror and the focal axis of the focusing optical element. The method can further include rotating the movable mirror upon the axis to direct the first light field toward the focusing optical element.

In any of the embodiments described herein, the focusing optical element can be a cylindrical mirror.

In any of the embodiments described herein, the movable mirror can be a planar galvanometer mirror rotatable upon an axis. The method can further include rotating the movable mirror upon the axis to direct the first light field toward the focusing optical element.

In any of the embodiments described herein, the movable mirror can be a polygonal mirror rotatable around a rotational axis. The method can further include rotating the movable mirror upon the rotational axis to direct the first light field toward the focusing optical element.

In any of the embodiments described herein, the method can further include repeating the directing and the delaying steps a plurality of times to extend a delay range and/or reduce aberrations.

In any of the embodiments described herein, the method can further include directing an input light field across a beam splitter such that the input light field is split into the first light field directed to the delay module and a second light field directed to an object of interest. The method can further include combining the second light field with the delayed light field on a detector after the second light field interacts with the object of interest.

In any of the embodiments described herein, the method can further include calculating a position of the object of interest with respect to the beam splitter based on optical interference between the delayed light field and the second light field after the second light field interacts with the object of interest.

In any of the embodiments described herein, the method can further include calculating a complex refractive index of the object of interest based on optical interference between the delayed light field and the second light field after the second light field interacts with the object of interest.

In any of the embodiments described herein, the method can further include directing an input light field across a beam splitter such that the input light field is split into the first light field and a second light field. The method can further include combining the second light field and the delayed light field to create combined light fields. The method can further include directing the combined light fields across an object of interest thereby creating one or more new light fields with new spectral frequency content. The method can further include directing the one or more new light fields onto one or more detectors after transmission through or scattering from the object of interest. The method can further include determining a frequency-dependent phase and/or amplitude of the one or more new light fields based on a delay between the delayed light field and the second light field.

In any of the embodiments described herein, the first light field and the second light field can be optical pulses with spectral content of greater than 200 wavenumbers. The one or more new light fields can be detected at higher optical frequencies than the delayed light field and the second light field; or the one or more new light fields can be detected at lower optical frequencies than the delayed light field and the second light field.

In any of the embodiments described herein, the method can further include combining a fourth light field containing the same frequency components as the one or more new light fields. The method can further include constituting a local oscillator with any of the light fields previous to detection.

In any of the embodiments described herein, the method can further include combining a third light field with the combined light fields, the third light field being an optical pulse with spectral content of less than 30 wavenumbers and being fixed in time with the second light field. The method can further include directing the combined light fields with the third light field across an object of interest to create the one or more new light fields. The one or more new light fields can be detected at higher optical frequencies than the third light field; or the one or more new light fields can be detected at lower optical frequencies than the third light field.

In any of the embodiments described herein, the method can further include detecting, at the one or more detectors, the one or more new light fields along their primary polarization direction.

In any of the embodiments described herein, the method can further include detecting the one or more new light fields at the one or more detectors. The one or more new light fields can be separately and simultaneously detected at +45 degrees and at −45 degrees with respect to their primary polarization direction.

In any of the embodiments described herein, the method can further include directing an original light field across a first beam splitter such that the original light field is split into the first light field and a second light field. The method can further include directing the second light field across an object of interest thereby creating a third light field having new spectral frequency components compared to the second light field. The method can further include collecting the third light field after the second light field scatters from the object of interest and/or after the second light field transmits through the object of interest. The method can further include combining the third light field with a portion of the delayed light field having the same frequency components as the third light field in a second beam splitter, thereby creating combined light fields. The method can further include directing the combined light fields onto one or more detectors. The method can further include determining a frequency-dependent phase and/or amplitude of the combined light fields based on a delay between the delayed light field and the second light field.

In any of the embodiments described herein, the method can further include directing, prior to combining the third light field with the portion of the delayed light field, the delayed light field into a material to generate the portion of the delayed light field having the same frequency components as the third light field.

In any of the embodiments described herein, the original light field can contain the same frequencies as the third light field. The first beam splitter can be dichroic, thereby separating a frequency of the first light field from a frequency of the original light field that are common to new frequency components of the third light field.

In any of the embodiments described herein, the original light field can be an optical pulse with spectral content of greater than 200 wavenumbers. The third light field can be detected at optical frequencies higher than those in the second light field; or third light field can be detected at optical frequencies lower than those in the second light field.

In any of the embodiments described herein, the original light field can be a combination of a first original light field and a second original light field. The first original light field and the second original light field can be combined co-linearly and coincidentally in time. The first original light field can be an optical pulse with spectral content of greater than 200 wavenumbers. The second original light field can be an optical pulse with spectral content of less than 30 wavenumbers. The third light field can be detected at optical frequencies higher than those in the second light field; or the third light field can be detected at optical frequencies lower than those in the second light field.

In any of the embodiments described herein, the combined light fields can be detected along their primary polarization direction.

In any of the embodiments described herein, the combined light fields can be separately and simultaneously detected at +45 degrees and at −45 degrees with respect to their primary polarization direction.

In any of the embodiments described herein, the method can further include directing an original light field across an object of interest, thereby creating a second light field with new spectral frequency content compared to the original light field. The method can further include collecting the second light field after it scatters from the object of interest or after it transmits through the object of interest. The method can further include directing the second light field across a first beam splitter such that the second light field is split into the first light field and a third light field. The method can further include combining the delayed light field and the third light field in a second beam splitter to create combined light fields. The method can further include directing the combined light fields onto one or more detectors. The method can further include determining a frequency-dependent amplitude of the combined light fields based on a delay between the delayed light field and the third light field.

In any of the embodiments described herein, the original light field can be an optical pulse with spectral content of greater than 200 wavenumbers. The first and third light fields can be detected at optical frequencies higher than those in the original light field; or the first and third light fields can be detected at optical frequencies lower than those in the original light field.

In any of the embodiments described herein, the original light field can be a combination of a first original light field and a second original light field. The first original light field and the second original light field can be combined co-linearly and coincidentally in time. The first original light field can be an optical pulse with spectral content of greater than 200 wavenumbers. The second original light field can be an optical pulse with spectral content of less than 30 wavenumbers. The first and third light fields can be detected at optical frequencies higher than those in the original light field; or the first and third light fields can be detected at optical frequencies lower than those in the first light field.

In any of the embodiments described herein, the first light field and the third light field can be detected along their primary polarization direction.

In any of the embodiments described herein, the first light field and the third light field can be separately and simultaneously detected at +45 degrees and at −45 degrees with respect to their primary polarization direction.

Another exemplary embodiment of the present invention provides a system for providing an optical delay to a light field. The system can include a light field source configured to provide a first light field. The system can include a delay module. The delay module can include a movable mirror, a focusing optical element having a focal axis parallel to its length, a return mirror. The movable mirror can be configured to receive the first light field and reflect the first light field to the focusing optical element. The focusing optical element can be configured to receive the first light field reflected from the movable mirror and return the first light field to the return mirror. The return mirror can be configured to receive the first light field reflected from the focusing optical element and reflect the first light field back to the focusing optical element.

In any of the embodiments described herein, the movable mirror can be rotatable upon an axis. The movable mirror can be positioned such that the movable mirror intersects the focal axis of the focusing optical element. The return mirror can be positioned such that the return mirror intersects the focal axis of the focusing optical element. The first light field can approach the delay module along a line which is a linear combination of the axis of the movable mirror and the focal axis of the focusing optical element.

In any of the embodiments described herein, the focusing optical element can be a cylindrical mirror.

In any of the embodiments described herein, the movable mirror can be a planar galvanometer mirror rotatable upon an axis.

In any of the embodiments described herein, the movable mirror can be a polygonal mirror rotatable around a rotational axis.

In any of the embodiments described herein, the system can have a scan rate of greater than 1.0 kHz.

In any of the embodiments described herein, the system can have a scan rate of greater than 40.0 kHz.

Another exemplary embodiment of the present invention provides a method. The method can include directing an input light field across a beam splitter such that the input light field is split into a first light field and a second light field. The method can include delaying the first light field with respect to the second light field, thereby creating a delayed light field. The method can include combining a third light field with the second light field and the delayed light field to create combined light fields. The third light field can be an optical pulse with spectral content of less than 30 wavenumbers and can be fixed in time with the second light field. The method can include directing the combined light fields across an object of interest, thereby creating one or more new light fields with spectral frequency content. The method can include directing the one or more new light fields onto one or more detectors after transmission through or scattering from the object of interest. The method can include determining a frequency-dependent phase and/or amplitude of the one or more new light fields based on a delay between the delayed light field and the second light field.

In any of the embodiments described herein, the first light field and the second light field can be optical pulses with spectral content of greater than 200 wavenumbers. The one or more new light fields can be detected at higher optical frequencies than the third light field; or the one or more new light fields can be detected at lower optical frequencies than the third light field.

In any of the embodiments described herein, the method can further include detecting, at the one or more detectors, the one or more new light fields along their primary polarization direction.

In any of the embodiments described herein, the method can further include detecting the one or more new light fields at the one or more detectors. The one or more new light fields can be separately and simultaneously detected at +45 degrees and at −45 degrees with respect to their primary polarization direction.

In any of the embodiments described herein, the step of delaying the first light field with respect to the second light field can include directing the first light field to a delay module. The delay module can include a movable mirror, a focusing optical element having a focal axis parallel to its length, and a return mirror. The movable mirror can be configured to receive the first light field and reflect the first light field to the focusing optical element. The focusing optical element can be configured to receive the first light field reflected from the movable mirror and return the first light field to the return mirror. The return mirror can be configured to receive the first light field reflected from the focusing optical element and reflect the first light field back to the focusing optical element.

In any of the embodiments described herein, the movable mirror can be rotatable upon an axis. The movable mirror can be positioned such that the movable mirror intersects the focal axis of the focusing optical element. The return mirror can be positioned such that the return mirror intersects the focal axis of the focusing optical element. The first light field can approach the delay module along a line which is a linear combination of the axis of the movable mirror and the focal axis of the focusing optical element. The method can further include rotating the movable mirror upon the axis to direct the first light field toward the focusing optical element.

In any of the embodiments described herein, the focusing optical element can be a cylindrical mirror.

In any of the embodiments described herein, the movable mirror can be a planar galvanometer mirror rotatable upon an axis. The method can further include rotating the movable mirror upon the axis to direct the first light field toward the focusing optical element.

In any of the embodiments described herein, the movable mirror can be a polygonal mirror rotatable around a rotational axis. The method can further include rotating the movable mirror upon the rotational axis to direct the first light field toward the focusing optical element.

In any of the embodiments described herein, the method can further include redirecting the first light field to the delay module a plurality of times to extend a delay range and/or reduce aberrations.

Another exemplary embodiment of the present invention provides a method. The method can include directing a first light field across an object of interest. The method can further include directing a delayed light field across the object of interest. The method can further include directing a picosecond probe light field across the object of interest. The method can further include creating a signal field with the first light field, the delayed light field, and the picosecond probe light field after the first light field, the delayed light field, and the picosecond probe light field interact with the object of interest. The method can further include analyzing the signal field with a broadband coherent anti-Stokes Raman scattering technique after applying delay on the delayed light field.

In any of the embodiments described herein, the method can further include creating the delayed light field by: passing a second light field through a beam splitter to create a third light field; and directing the third light field to a movable mirror, to a cylindrical mirror having a focal axis parallel to a length of the cylindrical mirror, and to a return mirror.

In any of the embodiments described herein, the method can further include dispersing the signal field before applying it onto a single-element or multi-element detector. The method can further include varying timing of the delayed light field. The method can further include recovering signal oscillations based on a variation of the delayed light field.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE FIGURES

Reference will now be made to the accompanying figures and diagrams, which are not necessarily drawn to scale, and wherein.

DETAILED DESCRIPTION

Figure 1A:
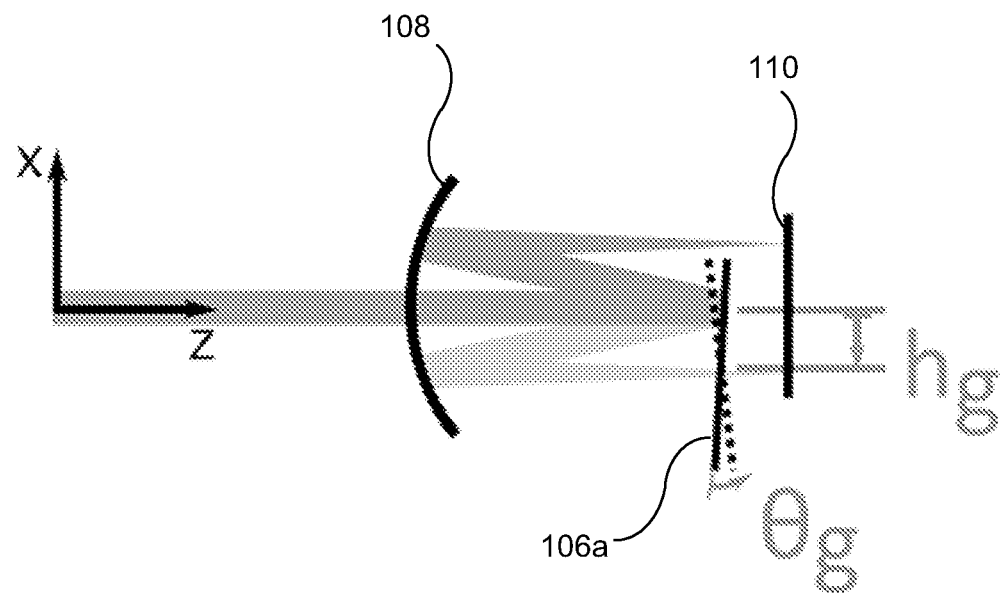
FIGS. 1A-1C depict an example layout for a reduced-aberration delay line using a planar galvanometer, according to aspects of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

To facilitate an understanding of the principles and features of the disclosure, various illustrative embodiments are explained below. In particular, the presently disclosed subject matter is described in the context of systems and methods for providing an optical delay line that can be used in optical techniques such as interferometry, spectroscopy, and/or coherent anti-Stokes Raman scattering. The present disclosure, however, is not so limited and can be applicable in outer contexts. For example, some examples of the present disclosure may improve other optical techniques that require one reference light field to be delayed with respect to another light field. Accordingly, when the present disclosure is described in the context of systems and methods for providing an optical delay line that can be used in optical techniques such as interferometry, spectroscopy, and/or coherent anti-Stokes Raman scattering, it will be understood that other embodiments can take the place of those referred to.

Figure 3:
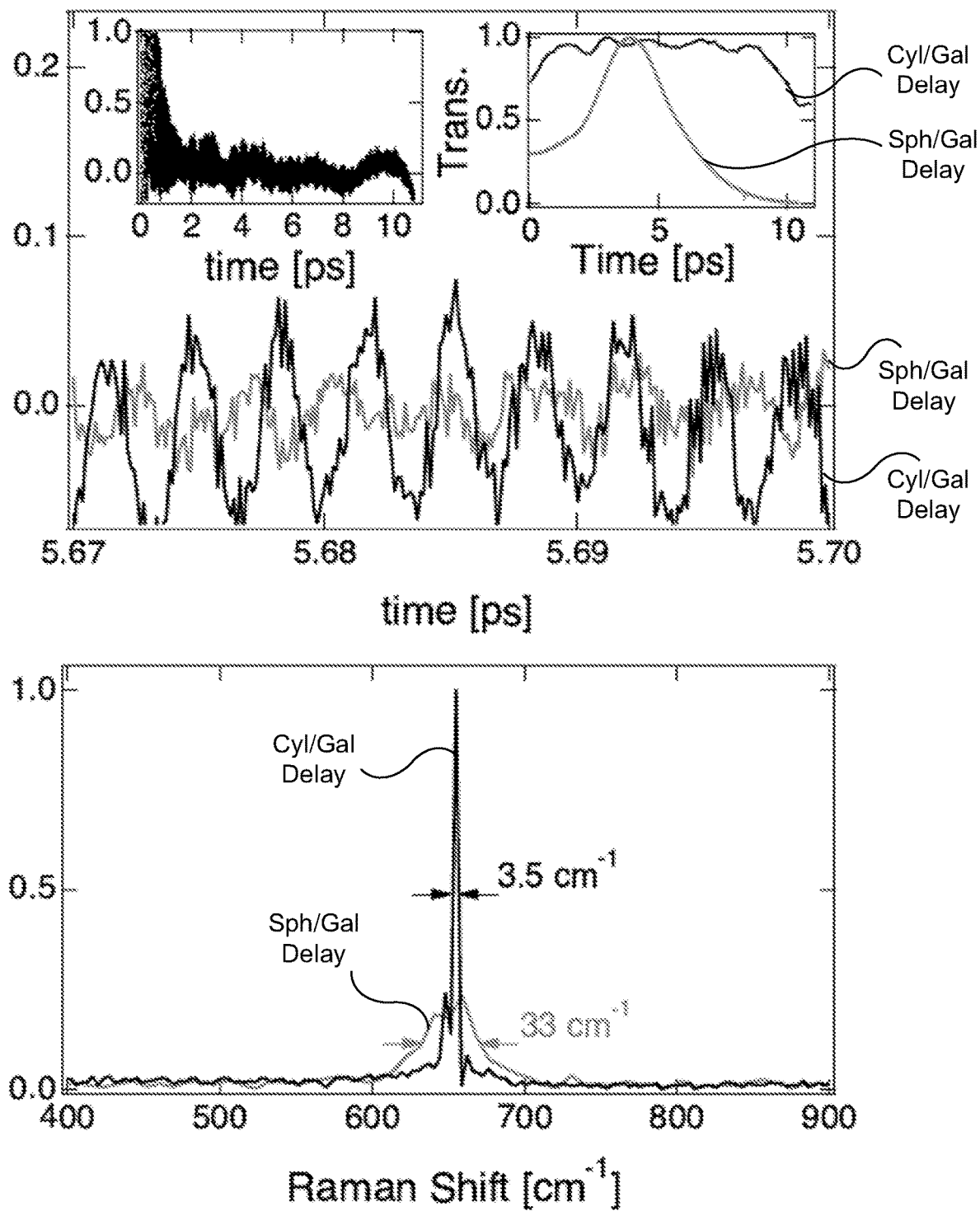
FIG. 3 depicts the results of testing example delay line architectures.

As described above, various optical techniques such as interferometry and pump-probe spectroscopies require optical delay of one light path with respect to the other. Prior art designs for creating a delay line included a series of mirrors, including a first mirror, a spherical mirror, and a return mirror. An input light field was directed at the first mirror such that the light field would proceed from the first mirror, to the spherical mirror, to the return mirror, and back. The first mirror was oscillated to redirect the light field to a different point on the spherical mirror, thereby changing the path length of the light field and, thereby, creating a delay in the line. An issue with these prior art designs was that the design suffered from off-axis beam displacement. The spherical mirror used in the designs had a single focal point. As the angle of the input light field changed (i.e., by moving the first mirror), the beam of the input field hit the spherical mirror farther from the center of the mirror. Wavefront aberrations increased as the input field traveled farther from the center of the mirror, resulting in loss of interferometric contrast at longer path delays. FIG. 3 is illustrative of the 10-fold better spectral resolution and signal-to-noise ratio obtained in coherent anti-Stokes Raman scattering implementation of the new delay line compared to the prior art.

Delay Line

In applications such as broadband Fourier-transform coherent anti-Stokes Raman scattering (FT-CARS), rapidly repeating, dispersion-free pulse delay on the order of several ps is required. To solve the issue of wavefront aberrations found in the prior art, the present disclosure describes a dispersion-free optical delay line that provides very low aberration over a delay range of at least 10 ps. The design compensates for delay-dependent off-axis beam displacements by directing them along a line of symmetry introduced with a focusing element, which can include a cylindrical mirror. The disclosure also provides two additional implementations for providing the delay line: one based on a galvanometric mirror (i.e., planar) and one based on a rotating polygonal mirror.

Figure 1B:
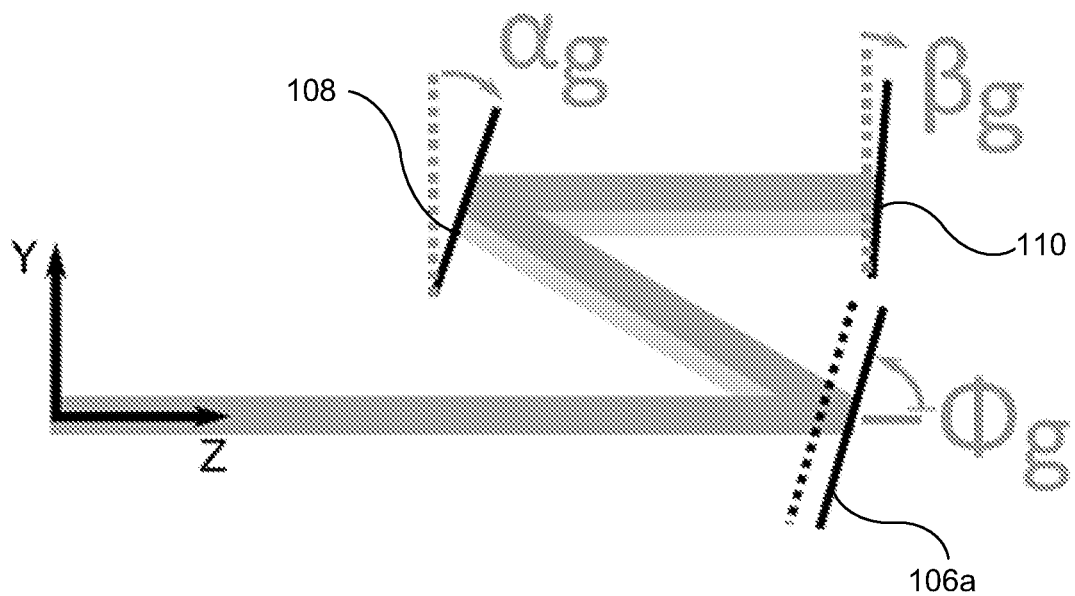
Figure 1C:
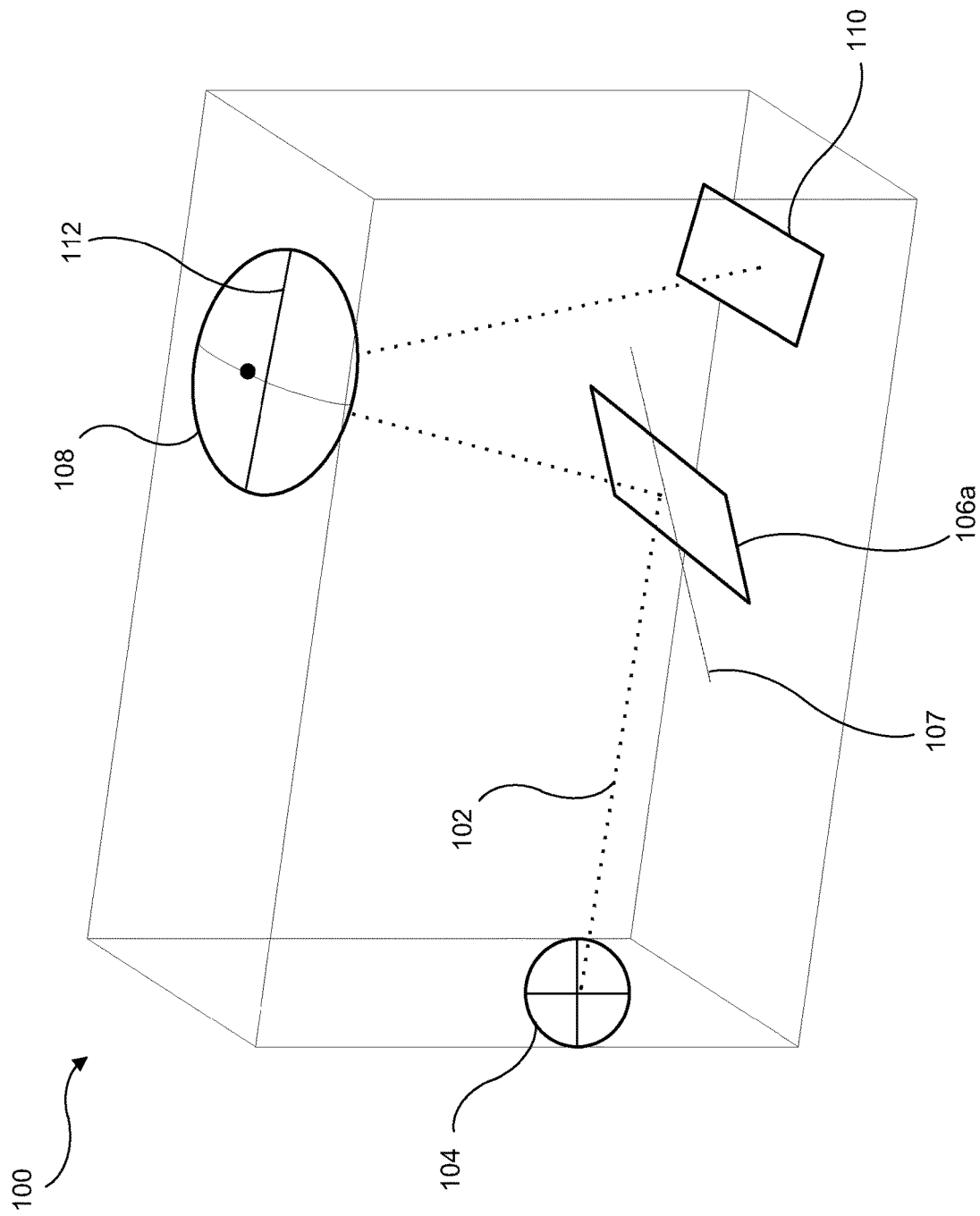

FIGS. 1A-1H provide example layouts for reduced-aberration delay lines. FIGS. 1A-1C depict an example layout for a reduced-aberration delay line where optical path changes are induced by a change in mirror angle ($\theta_g$) of a galvanometer. FIGS. 1A and 1B show the X-Z and Y-Z projections of the delay line using a cylindrical mirror and a galvanometer (Cyl/Gal) design; FIG. 1C is a schematic of the Cyl/Gal design. A collimated light field 102 from a source 104 can be sent on the edge of a movable mirror 106a (a planar galvanometer mirror in this example), at a distance $h_g$ from its axis 107. A focusing element 108 can be placed so that the surface of the movable mirror 106a at $\theta_g=0$ contains the focusing element's 108 focal axis 112. The focusing element 108 can, for example, be a cylindrical mirror having a focal axis 112 parallel to the length of the cylindrical mirror. A return mirror 110 can be placed at the focus of the cylindrical mirror (as shown in FIGS. 1B and 1C), so that the line-focused beams reflected along the z-direction by the cylindrical mirror are returned along the optical path.

The projection in FIG. 1A shows that the beam can be deflected at an angle 2 $\theta g$ from the galvanometer mirror (i.e., movable mirror 106a). At the cylindrical mirror (or other focusing element 108), the beam is reflected along a path that is quasi-parallel with the z-axis, as long as $\theta_g$ is small. As $\theta_g$ becomes large, the light sent to the cylindrical mirror from the galvanometer will appear to originate away from its focal axis 112, so it will not be reflected parallel to the z-axis and will not be returned along its original path. This shows up as a delay-dependent wavefront x-tilt in FIG. 2, right column. In order to minimize this effect, the $\theta_g$ can be minimized for any given delay $\Delta l$ by making $\phi_g$ as small as possible.

The Y-Z plane projection in FIG. 1B shows two beams representing light paths at different galvanometer mirror displacements. As it rotates, the galvanometer mirror moves along the incoming light path as $\Delta r_z = h_g \tan(\theta_g)/\sin(\phi_g)$ and reflects the light to a displacement-dependent point on the cylindrical mirror. As shown, the locus of those points forms a line that follows that symmetry line of the cylindrical mirror so that no path-length-dependent aberrations are introduced by the off-axis beam translations in this plane.

Light reflected from the cylindrical mirror is returned by a return mirror 110 that can be tilted slightly away from a plane parallel with the cylindrical mirror ($\alpha_g \neq \beta_g$) in order to send the light back along its original path in the Y-Z plane. This means that the optical path between the cylindrical mirror and retro-reflecting mirror can change slightly with path delay. Accordingly, the return mirror 110 plane may not contain the focal axis 112 of the cylindrical mirror at all delays, and a slight, delay-dependent astigmatism (wavefront x-curvature in FIG. 2) can be present. This effect can be minimized by optimizing $\alpha_g$ to reduce the difference $|\alpha_g - \beta_g|$, which requires $\phi_g$ to be close to $\pi/2$.

Optical delay generated by galvanometer rotation is essentially linear for small angle ($\approx \pm 5°$) and is given as:

$$\Delta l(\theta_g) = 2h \frac{\tan(\theta_g)}{\sin(\phi_g)} \left[ 1 + \frac{\sin(\gamma_g) + \sin(\alpha_g - \beta_g - \gamma_g)}{\cos(\alpha_g)(1 + \sin(2\phi_g)/\sin(\alpha_g))} \right] \quad \text{Equation 1}$$

where $\gamma_g = 2\theta_g + \alpha_g - \pi/2$.

The two sources of aberrations can be mutually minimized with appropriate limits on $\phi_g$ that depend primarily on the focusing element 108 curvature, the beam offset $h_g$, and beam diameter. These limits on $\phi_g$ are largely relaxed with the polygonal mirror design. To this end, another aspect of the present disclosure provides a polygonal movable mirror 106b, wherein the movable mirror 106b includes a plurality of facets 118 with which to deflect the incoming light field 102.

Figure 1D:
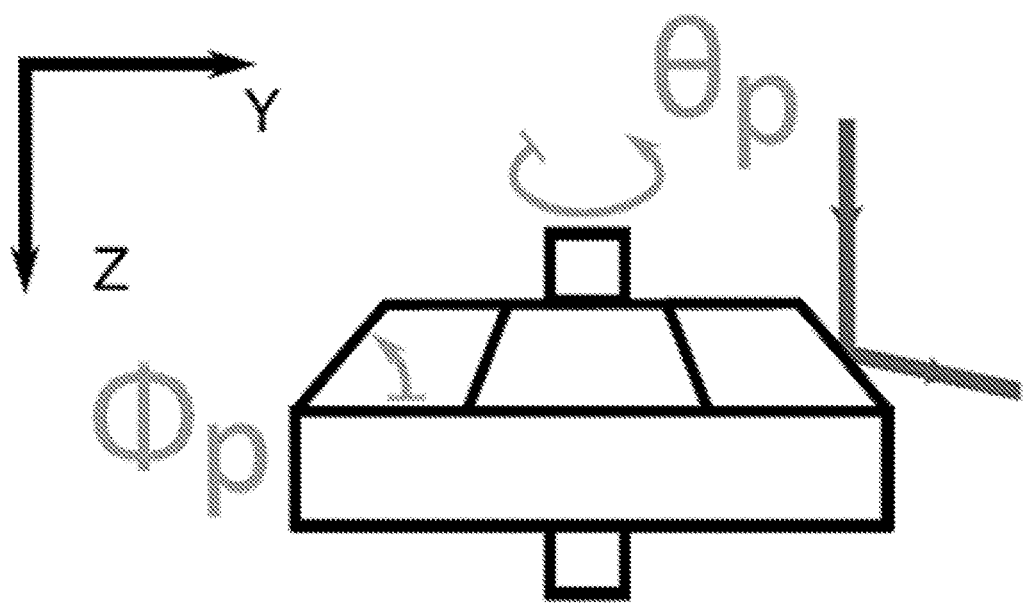
FIGS. 1D-1H depict an example layout for a reduced-aberration delay line using a polygonal mirror, according to aspects of the present disclosure.
Figure 1E:
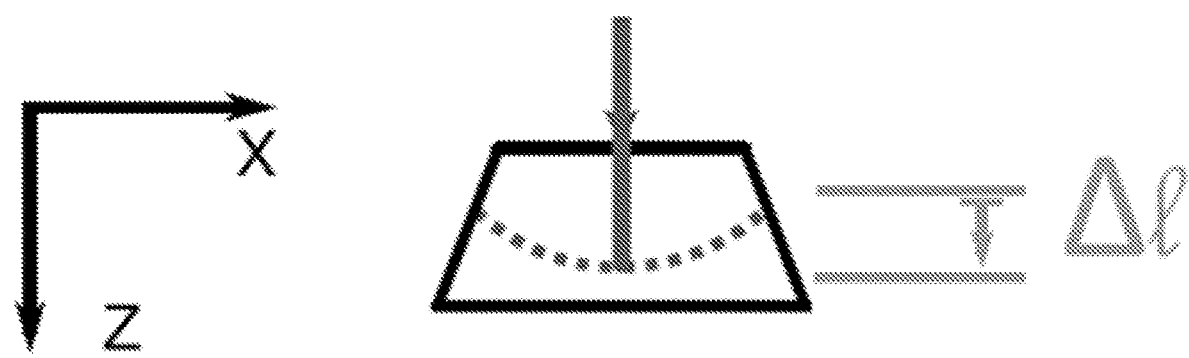
Figure 1F:
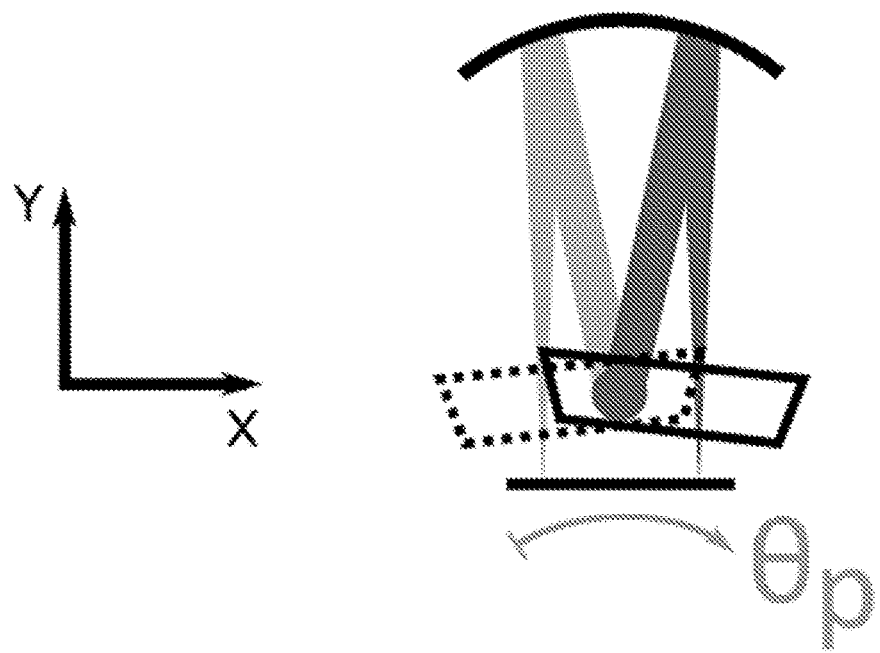
Figure 1G:
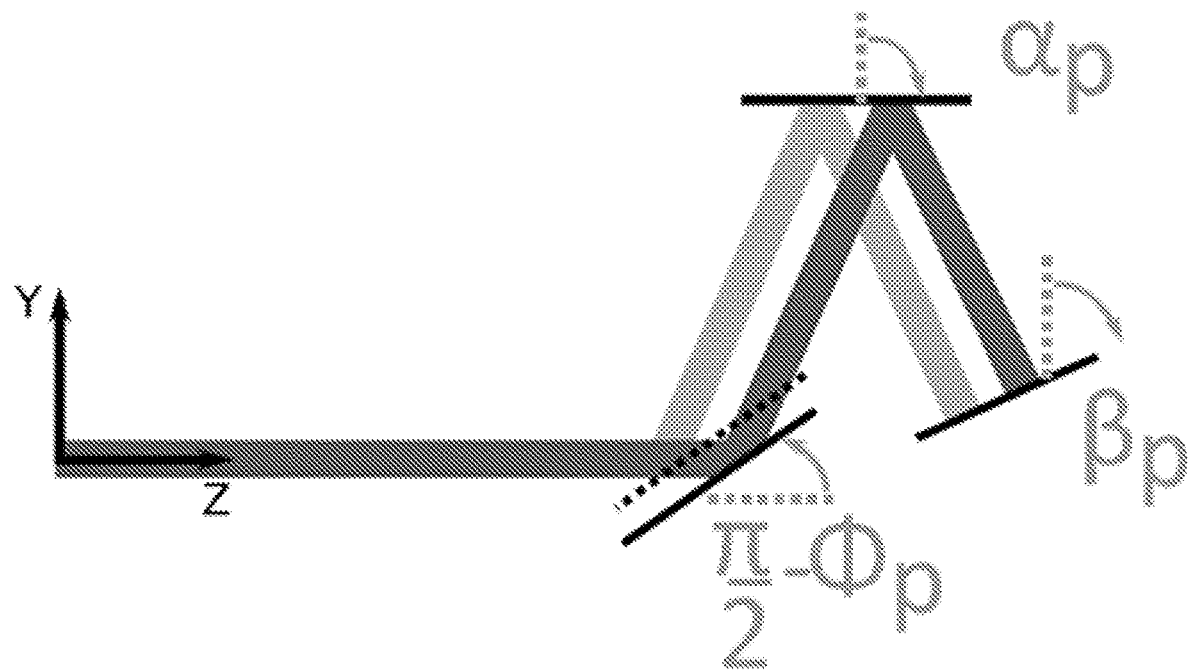
Figure 1H:
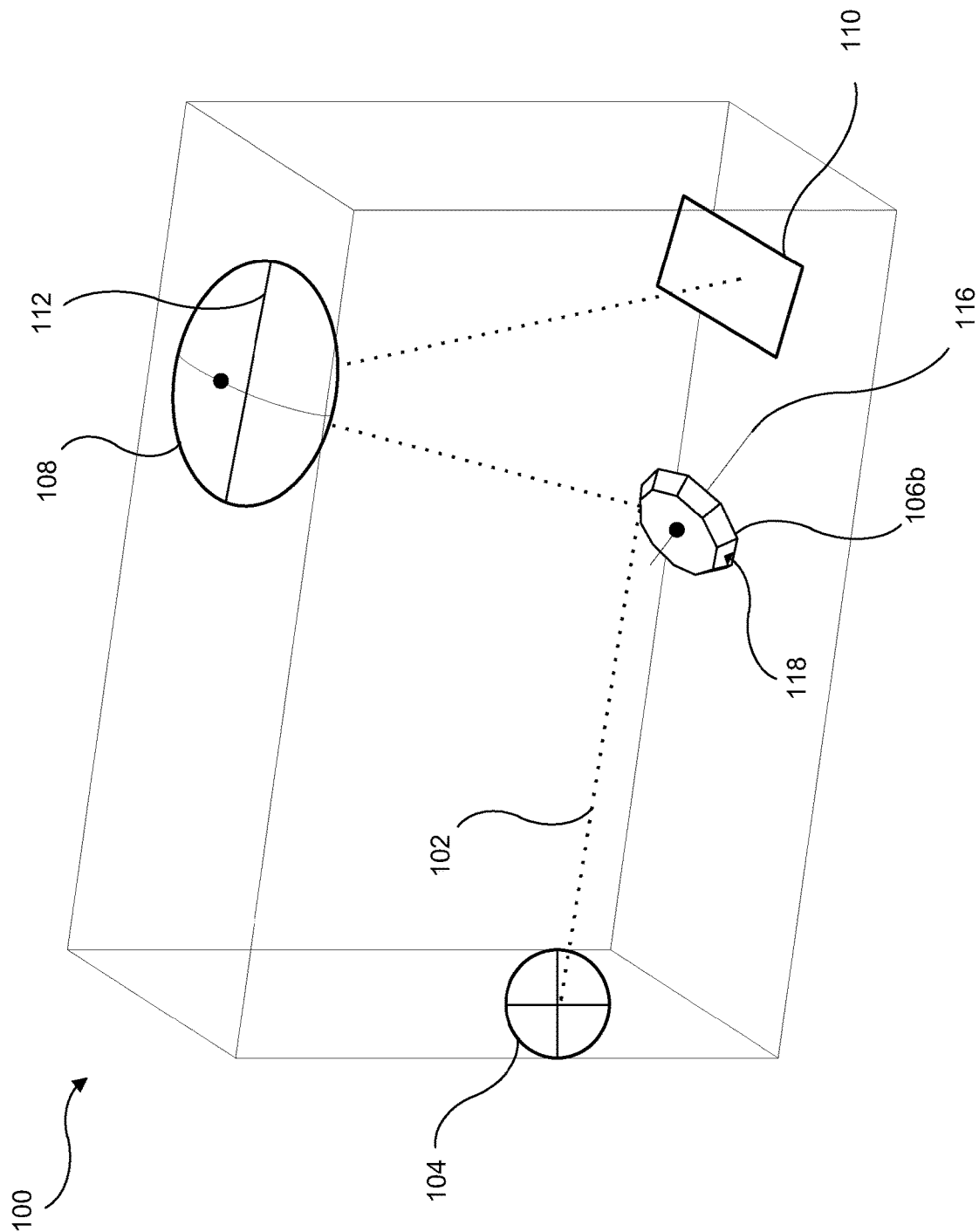

FIGS. 1D-1H depict an example layout for a reduced-aberration delay line where optical path changes are induced by rotating a polygonal movable mirror 106b (referred to herein as a "Cyl/Poly" design) around a rotational axis 116. FIG. 1D shows the Cyl/Poly design, with direction of incoming light; FIG. 1E shows the path incoming light traces across the mirror facets 118 of the polygonal mirror during scanner rotation around the rotational axis 116; FIGS. 1F and 1G depict angular deflection and translational displacement of the beam at discrete $\theta_p$ values in the X-Y and Y-Z planes, respectively; and FIG. 1H is a schematic of the Cyl/Poly design. Differently shaded paths reflect distinct mirror rotations. A cylindrical mirror can be placed so that the loci of intersections between the incoming light field 102 and the movable mirror 106b surface form a line coincident with the cylindrical mirror focal axis 112. As with the galvanometer (e.g., Cyl/Gal) design, a return mirror 110 can be placed at the cylindrical mirror focus, but displaced away from the polygonal movable mirror 106b (as shown in FIGS. 1G and 1H) so that the line-focused beams reflected along the z-direction by the cylindrical mirror are returned along the optical path. Here, the light deflected by the polygonal movable mirror 106b always originates at the cylindrical mirror focal axis 112, and no aberrations arise from the rotating movable mirror 106b.

FIG. 1E shows the path traced by the intersecting light as the movable mirror 106b rotates around the rotational axis 116. The position differential in the plane of the facet 118 is given by $R_p[1-\cos(\Theta_p)]$ where $R_p$ is the distance between the mirror rotational axis 116 and the axis of light impinging on the polygonal movable mirror 106b. Accordingly, the differential path length given by intersection of the facet 118 and the light beam along the z-axis is given by $\Delta h = R_p[1-\cos(\theta_p)]\tan(\phi_p)$. Optical delay in the polygonal movable mirror 106b design is approximately parabolic in $\theta_p$, and given by:

$$\Delta l(\theta_p) = R_p[1-\cos(\theta_p)]\tan(\phi_p) \times \left[1 + \frac{\sin(\gamma_p) + \sin(\alpha_p - \beta_p - \gamma_p)}{\cos(\alpha_p)(1 + \sin(2\phi_p)/\sin(\alpha_p))}\right]$$

Equation 2 where $\gamma_g = 2\theta_p + \alpha_p - \pi/2$. For both scanner designs, both Cyl/Gal (e.g., FIGS. 1A-1C) and Cyl/Poly (e.g., FIGS. 1D-1H), it may be beneficial that divergence of the beam not change much over the delay range of the apparatus, and that the beam size remains small compared to the area of the reflective surfaces. The former calls for a small beam divergence and long Rayleigh range ($z_R$), thus large beam size, opposing the latter requirement. Generally, one can find design parameters that will satisfy both constraints, and the desired delay range largely sets the parameters for these competing needs.

Simulation Results for Cyl/Gal and Cyl/Poly

Based on simulations, it is shown that a 50 mm focal length cylindrical lens and 2 mm spot diameter are appropriate for a 10 ps delay range with a central wavelength of 1080 nm. The total path length for both Cyl/Gal and Cyl Poly mirror arrangements was 100±10 mm, much shorter than $z_R$=0.75 m, yielding no significant delay-dependent divergence.

Figure 2:
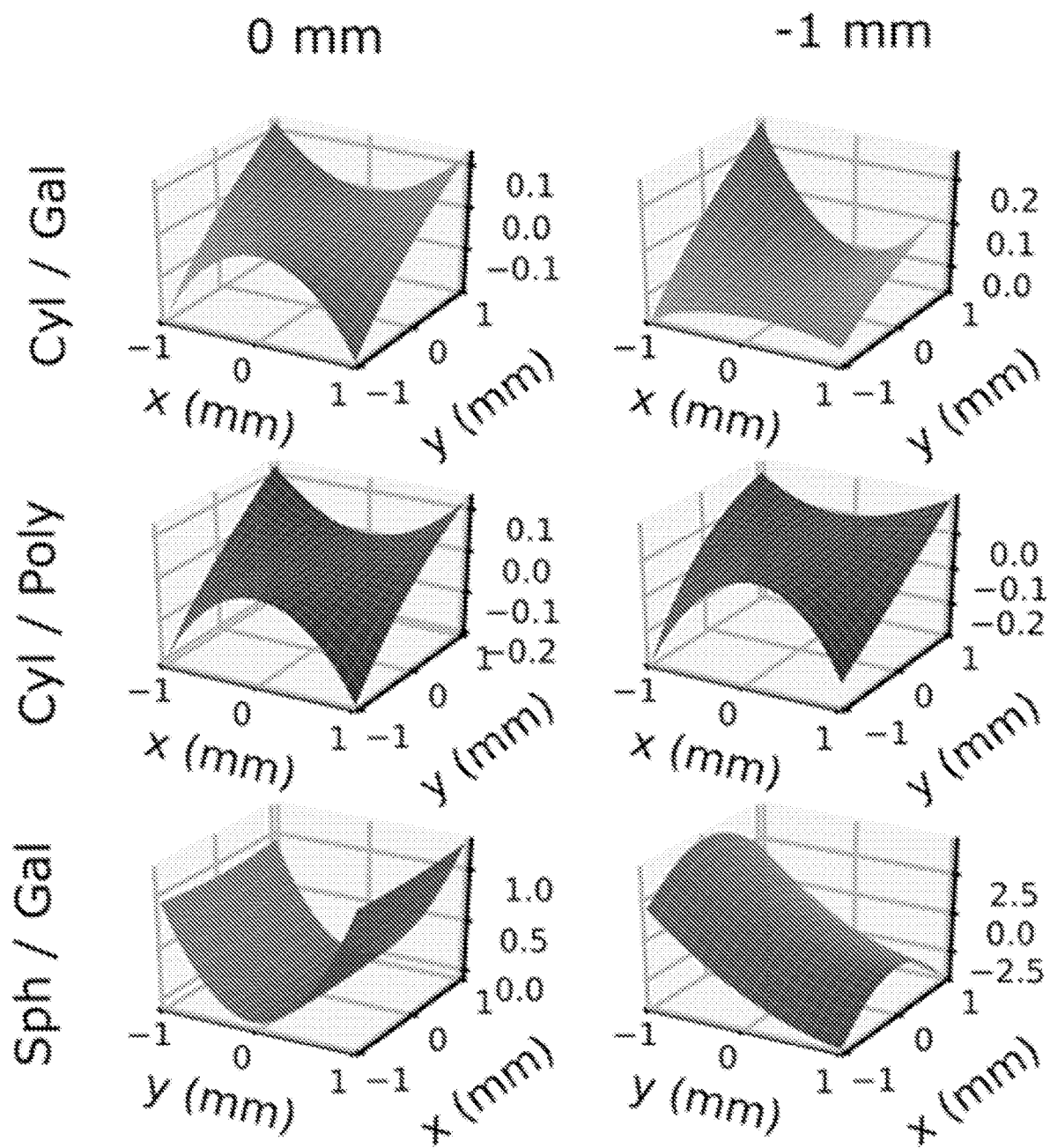
FIG. 2 depicts wavefront simulations for example delay line architectures.

FIG. 2 shows wavefront simulations at delays of 0 and −1 mm (−3.3 ps round trip) for outputs of the two designs displayed in FIGS. 1A-1H, Cyl/Gal and Cyl/Poly, and for a galvanometer-based delay line using a spherical mirror (Sph/Gal). The Sph/Gal design, as described above, is a prior art design that uses a spherical mirror that lacks the line of symmetry introduced herein with the cylindrical mirror. Optical component positions and angles were optimized to minimize wavefront aberrations for all simulations. The optimized delay line parameters are given in Table 1.

TABLE 1

|  | φ | θ₀ | α | β | h (mm) | $R_p$ (mm) |
| --- | --- | --- | --- | --- | --- | --- |
| Cyl/Gal | 70 | 0 | −20 | 0 | 8 |  |
| Cyl/Poly | 70 | 0 | −90 | −80 |  | 50.8 |
| Sph/Gal | 90 | 20 | 20 | 0 | 8 |  |

Wavefronts calculated for each of the three scanners at zero delay show some astigmatism, i.e., they have different wavefront curvature along the x and y axes. For the Cyl/Gal and Cyl/Poly layouts shown in FIGS. 1A-1H, delay-dependent astigmatism is negligible, and the static (zero delay) astigmatism dominates, even though it is also quite small (<0.2λ). By contrast, both static and delay-dependent astigmatism is significant for the Sph/Gal design. Here, the astigmatism arises from arrangement of the spherical mirror. Because φ≠0, the beam impinging on the spherical mirror neither originates from, nor is focused to, the focal point of the spherical mirror. Astigmatism across the beam ranges from ≈λ at zero delay to ≈2.5λ at −1 mm delay, changing sign, axis, and amplitude.

Wavefront tilt (asymmetry in the profiles around the x=0 or y=0 point) varies significantly between scanner designs. Cyl/Gal and Cyl/Poly show negligible tilt at zero delay, and between them only Cyl/Gal has a change in tilt with delay. For the Sph/Gal design, tilt changes significantly with delay. At −1 mm (delay=−3.3 ps round trip), tilt has changed by 2.5λ over the beam diameter. The wavefront plots clearly suggest that utilizing a focusing element 108 (e.g., cylindrical mirror) having a symmetry line along which off-axis beam deviations can be directed facilitates dramatically improved wavefront profiles at both delay positions shown. In fact, compared to the Sph/Gal design, reduction of beam displacement by ≥10λ and tilt by ≥1000λ is achieved for the designs introduced in this disclosure. The improvement can be contributed at least in part to the fact that the cylindrical mirror has a focal axis 112 instead of a focal point like the spherical mirror. Both the movable mirror 106a,b and the return mirror 110 can be placed on this focal axis 112, ensuring minimal geometric aberrations.

Experimental Results for Cylindrical Design

To demonstrate the utility of the scanner designs described above, the Cyl/Gal (and, for reference, the Sph/Gal) scanner was embedded into an FT-CARS arrangement. In each case, 40 fs pulses from a Coherent Fidelity (λ=1073 nm, repetition rate=73 MHz) were split, with one arm passing through the delay scanner. A 20 Hz ramp wave was used to drive a galvanometer to ±5 deg. The delayed and test reference arms were co-linearly recombined, and 1.5 nJ pulses from each were focused to $w_0$=3 μm into $CS_2$. The first pulse generates a vibrational coherence. The second pulse also generates a coherence, which interferes with the first at varying time delay. The degenerate four-wave mixing (DFWM) signal of the second pulse then generates an interferogram over the static background from the DFWM of the first pulse. The anti-Stokes DFWM signals were isolated using a 1010 nm shortpass filter and were detected using a photodiode as a function of scanner delay. The signal was low-pass filtered and sampled at 2 MHz, giving $10^5$ points per interferogram. The laser bandwidth was just sufficient to excite the 655 cm$^{-1}$ $v_1$ symmetric stretch of $CS_2$, which has a natural linewidth of <1 cm$^{-1}$.

FIG. 3 depicts the results of testing a Cyl/Gal delay line versus a Sph/Gal delay line. The top panel depicts late time section of FT-CARS time trace from the two scanners; the top left inset depicts FT-CARS time trace recording for Cyl/Gal; and the top right inset depicts light transmission through a 10 µm pinhole as a function of delay after passing through a Cyl/Gal or Sph/Gal scanner. The bottom panel depicts 655 cm$^{-1}$ $v_1$ symmetric stretch of $CS_2$ showing from Cyl/Gal delay and Sph/Gal scanners.

The left-side inset to the top panel of FIG. 3 shows a DC-subtracted FT-CARS signal transient obtained using the Cyl/Gal scanner. The time-zero signal extends to an amplitude of 20 on this scale but is truncated for clarity. The main part of the top panel displays a portion of the FT-CARS signal intensities at delay times ≈5.7 ps, using the Cyl/Gal and Sph/Gal scanners, showing that the Cyl/Gal signal fringe oscillations are about 2× stronger at this delay time. Simulations and experiment suggest that the smaller signal from the Sph/Gal scanner could be due to strongly delay-dependent wavefront tilt leading to poor beam overlap at long delays. To evaluate delay-dependent beam overlap, the beam exiting the scanner at zero-delay was focused to 10 µm with a 50 mm focal length lens. A 10 µm pinhole was placed at the focus, and light throughput as a function of scanner delay was measured. The right inset to the top panel in FIG. 3 shows beam transmission for the Sph/Gal scanner to be roughly 50% that of the Cyl/Gal scanner at 5.7 ps delay, accounting for the observed drop in FT-CARS signal.

The lower panel of FIG. 3 shows Raman spectra retrieved from Fourier transforms of FT-CARS interferograms generated in $CS_2$ using Cyl/Gal and Sph/Gal delay lines. Both interferograms were carried to delay times long enough to achieve resolution of ≈3.3 cm$^{-1}$ (delay 10 ps). The recovered {peak widths, signal-to-noise ratios} for the $v_1$ peak were {3.5 cm$^{-1}$, >200} and {33 cm$^{-1}$, <20} from the Cyl/Gal and Sph/Gal designs, respectively.

Discussion Related to Delay Lines

Both the Cyl/Gal and Cyl/Poly designs provide for dispersion-free delay lines with static and delay-dependent wavefront aberrations that are sufficiently small to allow transform-limited performance over a delay range of at least 10 ps, supporting a spectral resolution of ≈3.5 cm$^{-1}$ for FT-CARS and other techniques. This is the first time a dispersion-free high-speed-compatible delay scanner has demonstrated transform-limited performance over such a large scan range. Wavefront aberrations are minimized in these designs by inducing a symmetry line (here, with the cylindrical mirror). Off-axis beam displacements associated with varying time delays can be directed along this symmetry line.

The delay lines described above can be utilized in various optical techniques, including interferometry, spectroscopy, and/or coherent anti-Stokes Raman scattering. In the case of Raman microscopy, most of the biologically relevant information in a Raman spectrum is found in the fingerprint where peaks are congested narrow (<5 cm$^{-1}$ width), making them unresolvable with the highspeed mechanical delay lines of the prior art.

Implementations of Delay Line Designs into dFT-BCARS

As described herein, many linear and non-linear optical methods require optical delay of one light path with respect to the other. Fourier-transform coherent anti-Stokes Raman scattering (FT-CARS) is one of these techniques. The technique utilizes two fields (i.e., beams of light or electric fields) that interact with an object of interest, for example a biological specimen. One of the two fields is delayed with respect to the other. To this end, techniques to generate a Raman spectrum using FT-CARS can utilize the delay line architecture described above.

The following describes a new type of technique to generate and detect coherent Raman spectra. Hereinafter, the new technique can be referred to as dispersed Fourier Transform broadband coherent anti-Stokes Raman scattering ("dFT-BCARS" or "dispersive FT-BCARS"). The technique can utilize the delay line designs discussed above, or can be used with prior delay line designs. Dispersive FT-BCARS has two points of interest which together result in a roughly 100-fold increase in signal levels. One novel aspect of the design is the addition of a spectrally narrow read pulse. The other novel aspect is the application of a detection scheme wherein generated signal light is spectrally dispersed and focused on a single-element or multiple-element detector and the resulting electronic signal is summed on the detector.

Background on Anti-Stokes Raman Scattering

When implemented in an imaging modality, Raman spectroscopy provides contrast for many species that otherwise cannot be visualized reliably or at all in microscopy. It is especially useful for characterizing complex systems. In a chemically diverse system such as a biological cell, approximately 50 Raman peaks can easily be resolved. With a signal-to-noise ratio (SNR) of 3 in each peak, more than $10^{23}$ different spectral variations or "colors" can be distinguished. Such rich spectra provide a basis for highly specific identification of chemical species and has application in many fields including clinical and life sciences, corrosion, pharmaceuticals, microelectronics, batteries, carbon-based materials, catalysis, forensics, geology, and mineralogy. While its nearly universal provision of contrast is a benefit, interpretation of complex spectral can be a challenge, especially if many chemical components of the sample are unknown, as is frequently the case. Here, data dimension reduction approaches such as multivariate analysis (MVA) approaches or neural networks are typically used to interpret the spectra. These methods connect input data (typically peak amplitude and position) with known properties of materials connected with the spectra, so are no more reliable than the input spectra. Of course, whether or not these advanced data mining tools are used, or even if the chemical components are known, the degree to which one can trust peak shift positions and amplitudes determines one's ability to confidently draw conclusions from Raman scattering data.

Precise and reproducible Raman shift frequencies and amplitudes are a challenge for spontaneous Raman spectroscopy. Raman peak amplitudes are reported only qualitatively, and it is not uncommon to see peak shift variability on the order of ±5 cm$^{-1}$ or more for the same vibrational Raman lines. Perhaps an important reason for this is that, for dispersive (most commonly used) systems, optical transfer functions and wavelength calibration can vary with small alignment changes. In any case, this imprecision in amplitude and wavelength can be a problem in chemically complex samples, and particularly in a Raman imaging system where slight refractive variation in a sample can change beam alignment. Such shifts are often misinterpreted by MVA approaches as arising from new chemical species. Variability on this level is thus likely to be an important issue as Raman scattering is used increasingly in analysis of complex samples and even in medical diagnosis.

Another important factor is that spontaneous Raman scattering is a very inefficient process, with only one in $10^9$ photons scattering inelastically. Although not a problem for samples that can withstand high laser flux, acquiring a high-quality Raman spectrum can take seconds or minutes for most samples and high resolution spontaneous Raman imaging of even a single biological cell can require more than 10 hours in state-of-the-art instrumentation. This is thus far too slow to be applied broadly to such delicate samples. Spatial multiplexing can reduce the average time required for spectral acquisition, but applications such as food or pharmaceutical product quality control that might require rapid imaging are still out of reach, even though routine Raman spectral imaging would be of inestimable value for these.

To more clearly explain the issues at hand, it is beneficial to briefly describe generation of an overall broadband coherent anti-Stokes Raman scattering (BCARS) signal and extraction of the component proportional to the spontaneous Raman spectrum. In coherent anti-Stokes Raman (CARS), pump and Stokes laser fields interact with a medium to create a vibrational coherence or "stimulation profile," given as:

$$\overline{C}_{st}(\Omega) = \chi^{(3)}(\Omega)[E_S^* E_p](\Omega) \qquad \text{Equation 3}$$

where $E_p$, $E_S$ are the frequency-domain pump, and Stokes fields, respectively and * is the cross-correlation operator. Impulsive excitation can be achieved if a single ultra-short laser pulse containing sufficient bandwidth is used as a pump and Stokes field. The material response to the pump and Stokes laser fields is given by the third order nonlinear susceptibility, $\chi^{(3)}$, which contains Raman vibrationally resonant and non-resonant contributions:

$$\chi^{(3)}(\Omega) = \chi_{NR}^{(3)}(\Omega) + \chi_R^{(3)}(\Omega) \qquad \text{Equation 4}$$

$$= \chi_{NR}^{(3)}(\Omega) + \sum_m \frac{A_m}{\Omega_m - \Omega - i\Gamma_m}$$

where $A_m$, $\Omega_m$, and $\Gamma_m$ describe the amplitude, center frequency, and half-width of the $m^{th}$ Raman peak. $\chi_R^{(3)}$ is related to the spontaneous Raman spectrum $I_{Raman}$ as $I_{Raman}(\Omega) \propto \text{Im}\{\chi_R(\Omega)^{(3)}\}$. Although $\chi_R(\Omega)^{(3)}$ is the quantity of interest in BCARS, the signal is generated by interaction of a probe field ($E_{pr}(\omega)$) with the vibrational coherence $C_{st}(\Omega)$, so contains contributions from $\chi_R^{(3)}(\Omega)$ and $\chi_{NR}^{(3)}(\Omega)$ $$I_{CARS}(\omega+\Omega) \propto |\overline{C}_{st}(\Omega) * E_{pr}(\Omega)|^2 \qquad \text{Equation 5}$$

$$\propto |\chi_{NR}^{(3)}(\Omega)|^2 + |\chi_R^{(3)}(\Omega)|^2 + 2\chi_{NR}^{(3)}(\Omega)\text{Re}[\chi_R^{(3)}(\Omega)] \qquad \text{Equation 6}$$

where * is the convolution operation, $\omega$ is the laser frequency, and $\Omega$ is the Raman shift frequency.

The leftmost term in Equation 6 arises purely from the non-resonant response of the medium, and is referred to as the "non-resonant background" (NRB). For weak Raman peaks in the fingerprint spectral region, the NRB can be many orders of magnitude larger than the middle term containing only $\chi_R^{(3)}$, making the latter inaccessible. However, because the resonant and non-resonant signals are phase-locked, the rightmost term represents a stable heterodyne signal of intermediate strength containing resonant and non-resonant components. It is this term that facilitates detection of weak signals such as fingerprint oscillations from dilute scatterers in biological systems.

To analyze the system, it can be helpful to consider a simplified material system with a molecular response (R (t)) consisting of only a non-resonant and a single resonant response:

$$R(t) = \chi_{NR}^{(3)}\delta(t) + \chi_R^{(3)}\Theta_H(t)e^{i\Omega_R t}e^{-\Gamma_R t} \qquad \text{Equation 7}$$

where $\Theta_H(t)$ is the Heaviside function. For the sake of simplicity, it can also be assumed that the fields $E_p$ and $E_S$ in Equation 3 both arise from the same pulse, which can be called the "comb" pulse. In practice this pulse is ultra-short, typically ≈15 fs in duration, and can be approximated as delta functions in time. Under this assumption, (R(t)) can be replaced with $C_{st}(t)$ and $\chi_{NR}^{(3)}$, $\chi_R^{(3)}$ with $C_{NR}$, $C_R$, which are the amplitudes of the nonresonant and resonant coherences respectively. They are proportional to the product $\chi^{(3)}I_1^2$ where $I_1$ is the comb pulse intensity. Accordingly, the third order polarization ($P^{(3)}(t)$) in the sample, which leads to the signal field ($E_{sig}(t) = iP^{(e)}(t)$), is given as:

$$P^{(3)}(t) = \int_{-\infty}^{\infty} C_{st}(\tau)E_{pr}(t-\tau)d\tau \qquad \text{Equation 8}$$

where $E_{pr}(t)$ is the probe field.

FT-CARS as Presently Practiced and Issues with the System

Figure 4A:
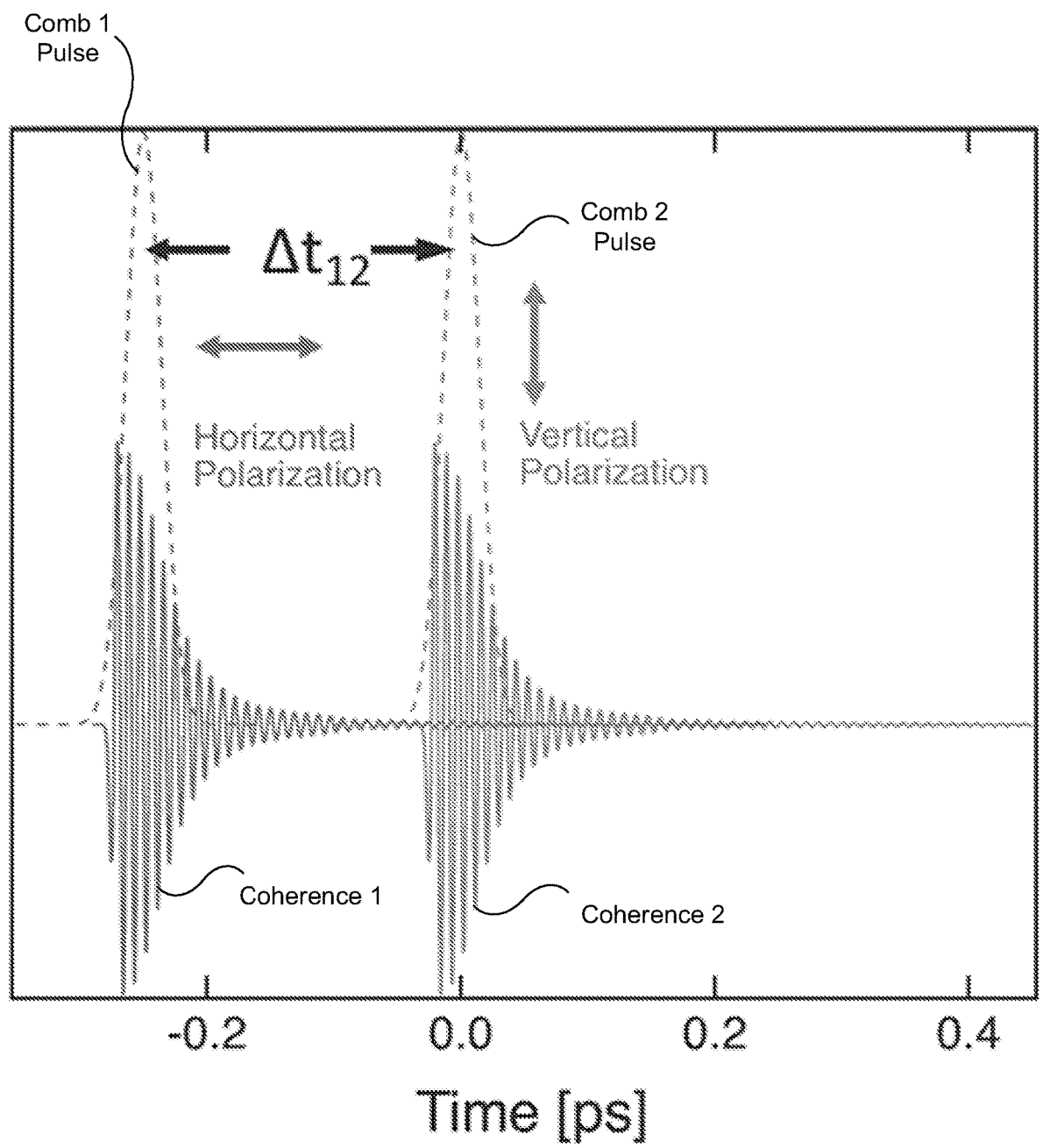
FIGS. 4A and 4B are graphs of signal generation for prior art broadband Fourier-transform coherent anti-Stokes Raman scattering (FT-CARS) techniques.
Figure 4B:
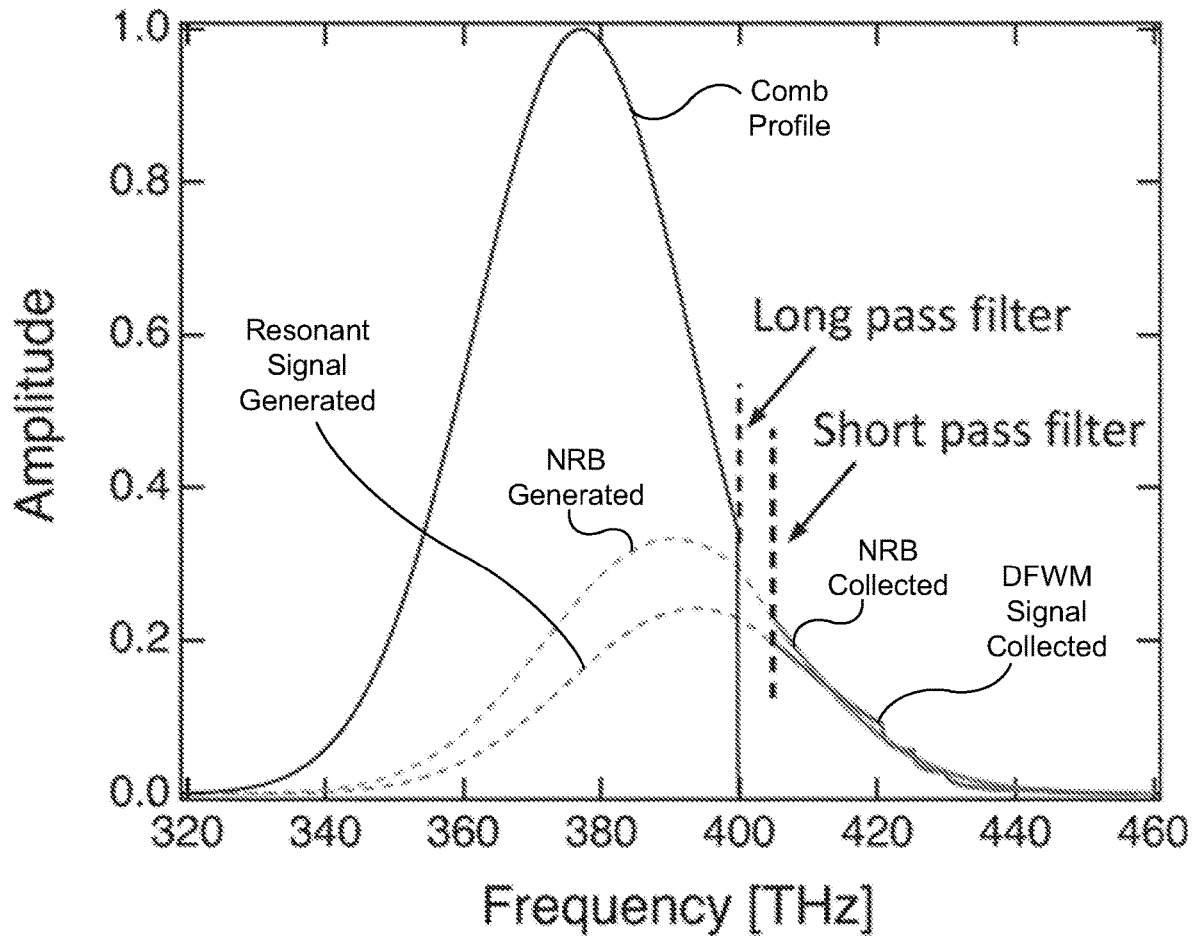

The Fourier transform CARS signal generation and detection process is diagrammed in FIGS. 4A and 4B. FIG. 4A is a Schematic of FT-CARS as heretofore implemented. Vibrational coherence is induced by each of the time-delayed laser pulses. Interference between the coherences varies with their temporal separation $\Delta t_{12}$, and this is encoded in a degenerate four-wave mixing (DFWM) signal generated by comb 2. The two combs are orthogonally polarized to avoid a coherent spike, but this leads to 10X signal reduction. In FIG. 4B, the comb profiles are truncated at short wavelength to provide a spectral region for DFWM anti-Stokes signal collection.

In FT-CARS, two ultra-short laser comb pulses impinge on the sample with a variable time spacing $t_{12}$. The first comb pulse provides the pump and Stokes fields, exciting a vibrational coherence, $\overline{C}_{st}(\Omega)$ over the fingerprint spectral region as described in Equation 3; the second comb pulse provides $E_{pr}$ and reads the coherence, as described by Equations 5 and 8. By design, the first pulse is temporally short enough to excite a significant spectral band (typically up to 2000 cm$^{-1}$), and the second pulse is short enough to resolve oscillations of the material vibration in this same frequency range. Anti-Stokes light scattered from the second pulse reflects the temporal oscillations and decay of the material coherence generated by the first pulse.

FT-CARS has yielded high-resolution Raman spectra of bulk liquids with very high signal-to-noise (SNR) in only 14 μs. It holds great appeal for many reasons. These include: 1) signal detection is achieved with a mm-sized single element photodiode or PMT, so maintaining alignment is trivial; 2) these detectors have fast response times and direct readout, enabling even GHz signal acquisition rates; 3) the full-time trace is acquired very quickly, reducing the noise-equivalent bandwidth of the measurement; 4) very high-resolution spectra can be acquired by longer delays without the intrinsic resolution constraints imposed by spectroscopic instrumentation; 5) Raman shift frequencies can be determined to essentially arbitrary accuracy through interferometric calibration of the second pulse delay; and 6) transforming the collected interferograms to spectral domain is accomplished with a single Fourier transform. A significant drawback to FT-CARS, however, is that generating signal in the higher fingerprint region and the CH-stretch is very difficult owing to dispersion issues associated with the sub-10 fs pulses required to impulsively excite these spectral regions.

A time-domain expression for the FT-CARS signal can be obtained by assuming that pulses 1 and 2 can be represented by temporal delta functions. Taking $E_1=E_2=1$, and $t_1=0$, then for $t_2=\Delta t>0$:

$$I_{FT}(\Delta t) \propto \int_{-\infty}^{\infty} |[C_{ST}(t)+C_{ST}(t-\Delta t)]E_{pr}[\delta(t)+\delta(t-\Delta t)]|^2 dt \quad \text{Equation 9}$$

$$\propto 2C_{NR}^2 + 2C_{NR}C_R[2+e^{-\Gamma\Delta t}\cos(\Omega_R\Delta t)] + C_R^2[1+2e^{-\Gamma\Delta t}\cos(\Omega_R\Delta t) + \tfrac{1}{2}e^{-2\Gamma\Delta t}(\cos(\Omega_R 2\Delta t)+3)] \quad \text{Equation 10}$$

Assuming, as usual, that $C_{NR} \gg C_R$, the rightmost term is negligible, and the heterodyne term is the delay-dependent component of interest. The purely nonresonant terms, containing $C_{NR}^2$ arise from the pump-Stokes-probe interaction of a single comb and are independent of $\Delta t$. The heterodyne term arises from coherent mixing between the nonresonant field from comb 2 and the resonant field from the probe interaction of comb 2 with the resonant coherence generated by the first comb pulse.

Even with the most advanced FT-CARS approaches, rapid signal acquisition is possible only for systems such as bulk liquids with large $\chi^{(3)}$ that can withstand high laser flux. These fast FT-CARS measurements used pulse energies on the order of 10 nJ, whereas spectroscopic BCARS signals require pulse energies roughly 100 times lower, on the order of 50 pJ. There are several reasons for the signal level limitations of FT-CARS compared to BCARS. First, the two laser pulses in FT-CARS are polarized orthogonal to one another to avoid a "coherent spike" in the signal. Thus, the interference detected arises from the difference in depolarized tensor elements $|\chi_{1212}^{(3)}-\chi_{1122}^{(3)}|^2$ (the quantity detected) is at least 10 times smaller than $|\chi_{1111}^{(3)}|^2$ detected in BCARS. Second, the ≈15 fs laser pulses used in FT-CARS generate 100 fold higher NRB levels than the picosecond pulses typically used to read out spectroscopic CARS signals. A too-large NRB limits sensitivity, as its shot noise will obfuscate even the heterodyne term of Equations 6 or 10 for low concentration or weak scatterers. Third, the generated signal is detected with relatively low efficiency. FIG. 4B shows a spectral domain representation of the excitation pulse and signal profiles. Pulses of the same spectral content are used to generate and read the CARS signal, and only the anti-Stokes light of a cutoff filter is detected. Most of the generated signal is buried under the excitation profile, and <20% of the signal light detected.

The signal-to-background ration of FT-CARS relative to that of BCARS can be estimated as $(\widetilde{Signal}/\widetilde{NRB})^{1/2}$ where the tilde indicates NRB or signal relative to that of BCARS. Based on the three factors cited above (e.g., 100-fold higher NRB, 3-fold reduction in coherence generated, and 20% signal collection efficiency), the relative signal to background ratio can be estimated as $(0.10*0.2/100)^{1/2} \approx 0.02$, suggesting FT-CARS will have a roughly 50-fold worse sensitivity than BCARS, as suggested by experimental results discussed above.

New Dispersive FT-BCARS Architecture

Impulsive stimulation architectures can generate high quality CARS fingerprint spectra from low concentration weak scatterers in biological samples. Attention should be paid to signal generation and collection efficiency. In the instant dFT-BCARS implementation, all three sensitivity-reducing issues described above for FT-CARS can be resolved by introducing a probe pulse of narrow bandwidth (≈3 cm$^{-1}$) that is blue-shifted from the two pump/Stokes excitation pulses, and temporally synchronized with one of them, then detecting the signal in a spectrally dispersed way. Hereafter, the newly introduced ps pulse can be referred to as the picosecond or "ps" pulse. The arrangement of dFT-BCARS has the sensitivity already demonstrated in spectroscopic BCARS, but with the simplified, high-speed signal acquisition characteristic of FT-CARS.

Figure 5:
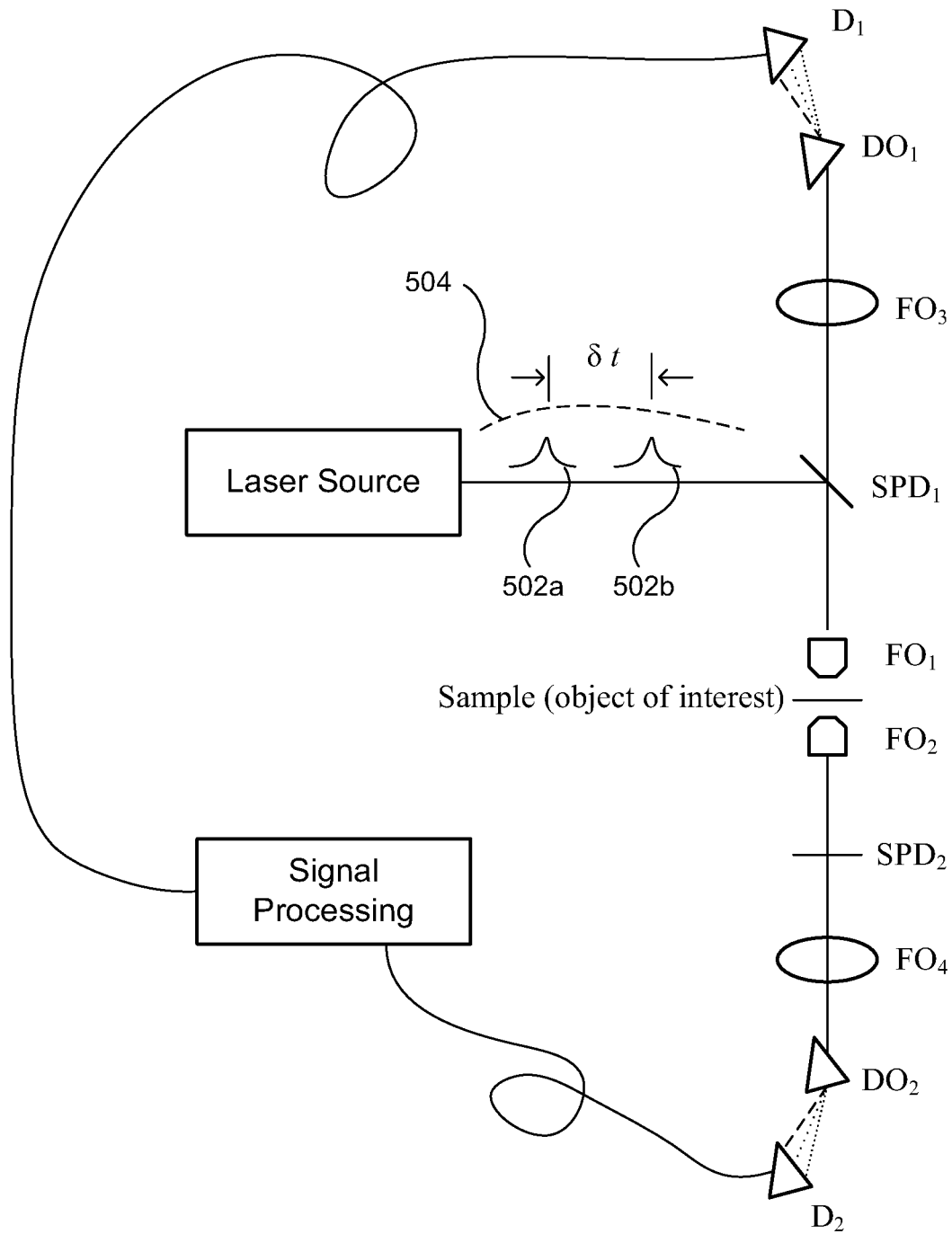
FIG. 5 shows exemplary components of a dispersed Fourier Transform broadband coherent anti-Stokes Raman scattering (dFT-BCARS) system, according to aspects of the present disclosure.

FIG. 5 shows exemplary components of a dFT-BCARS setup. In FIG. 5, a laser source can emit three synchronized laser pulses. Two femtosecond comb pulses 502a,b with variable intra-pulse timing ($\delta t$) are shown. A third, picosecond pulse 504 is shown that is fixed in time with the first femtosecond pulse 502a. SPD1 and SPD2 are short-pass dichroic filters that reflect the exciting light, but transmit the signal light. FO1 and FO2 are exciting light and signal light focusing optics used for focusing the exciting light on the sample and collecting the signal light. FO3 and FO4 are focusing optics that focus the signal light onto detectors D1 and D2 respectively. DO1 and DO2 are dispersive optics that spectrally disperse the signal light so that it focuses at the detector in a line with different colors separated. In the following sections, examples are provided for both generating a signal for the present dFT-BCARS and detecting the signal from the dFT-BCARS setup.

dFT-BCARS Signal Generation

Figure 6A:
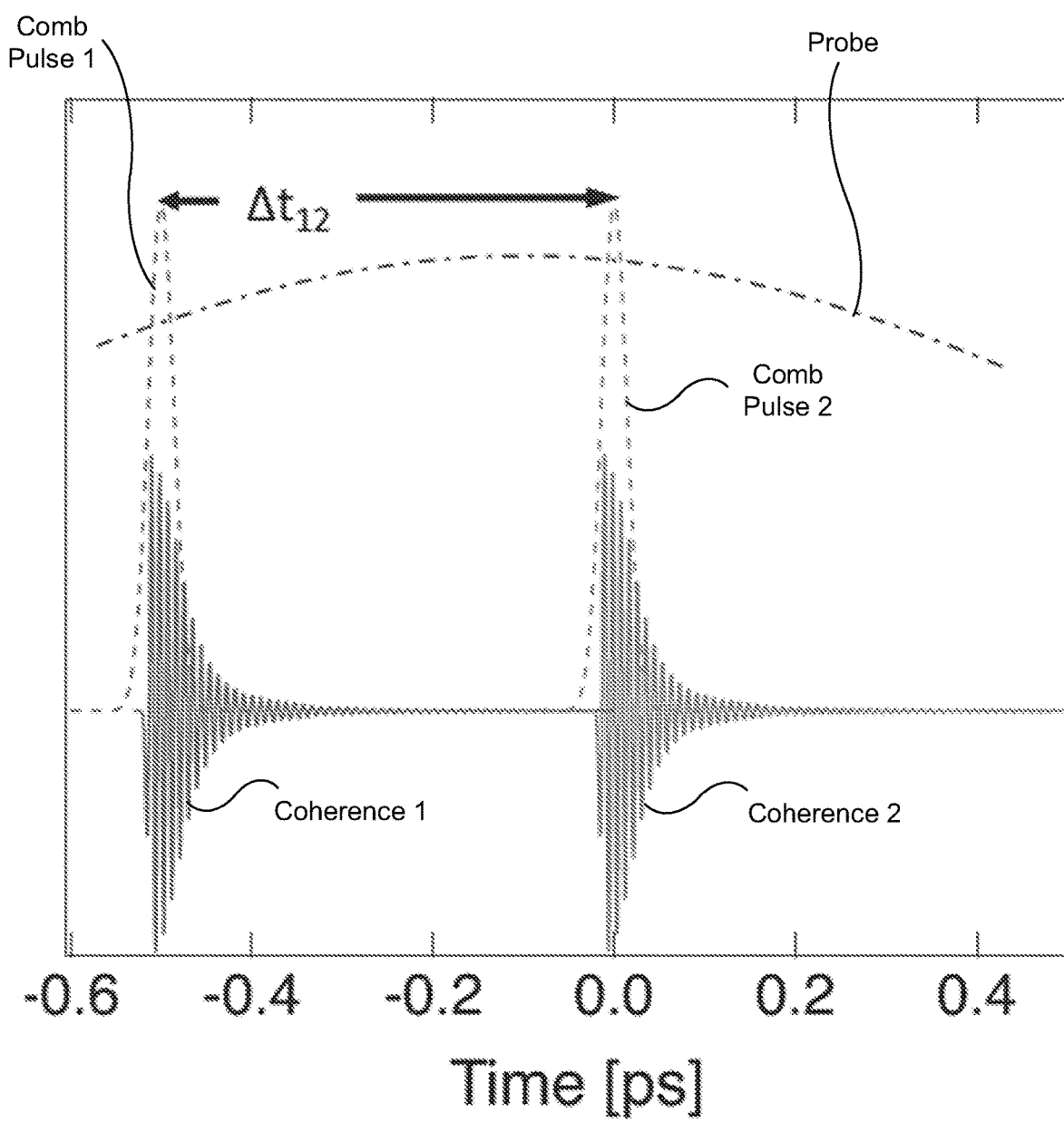
FIGS. 6A and 6B are schematic descriptions of a dFT-BCARS signal generation scheme, according to aspects of the present disclosure.
Figure 6B:
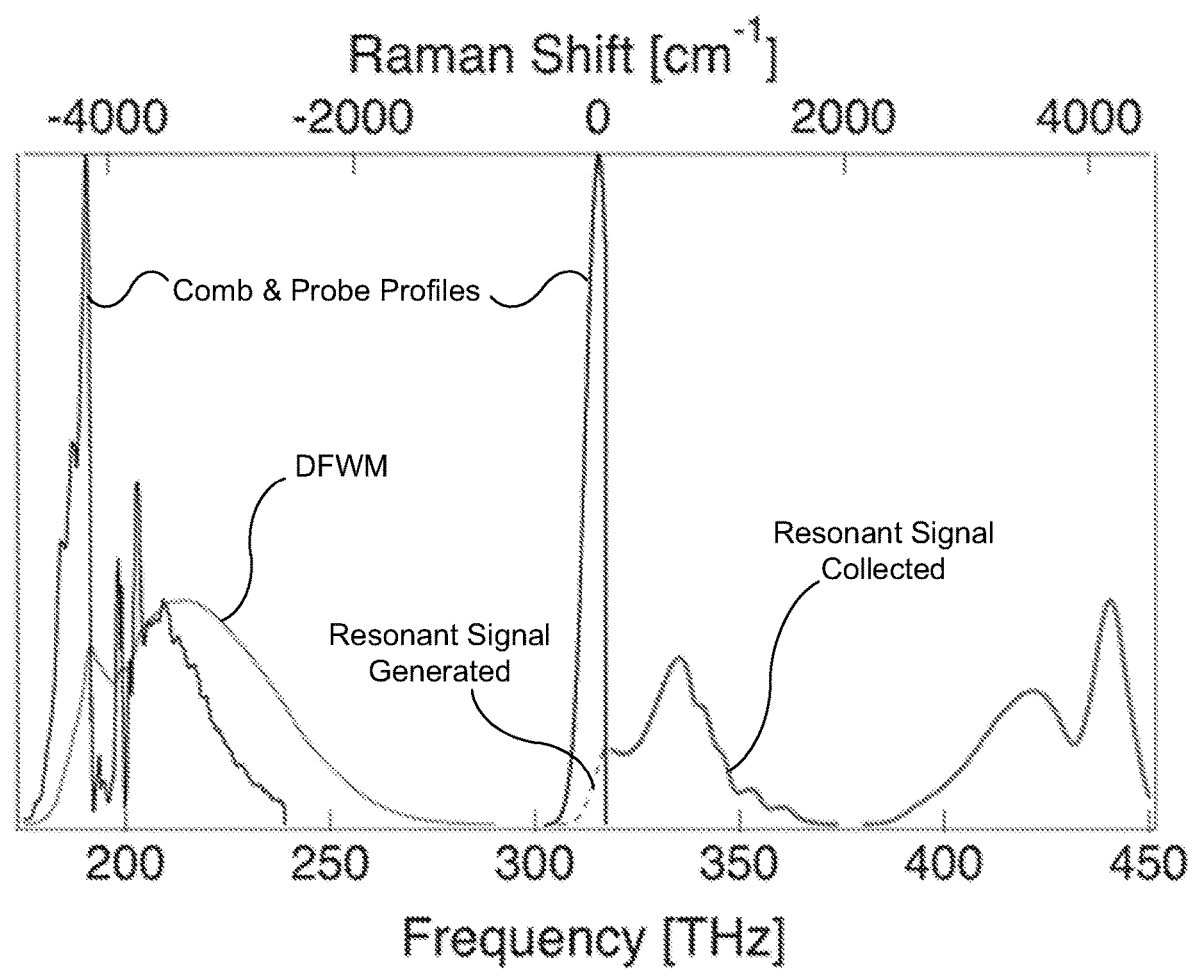

FIGS. 6A and 6B provide schematic descriptions of the novel dFT-BCARS signal generation scheme. FIG. 6A shows temporal arrangement of two ultra-short comb pulses that are combined as in FT-CARS, but with parallel (rather than perpendicular) polarization. The dashed lines represent comb pulses 1 and 2. The solid lines represent the time-dependent coherences generated by these pulses. The dash-dot line shows the field envelope of the third pulse, a temporally extended ps pulse that acts as the probe. Because it is several picoseconds in duration, it is present during both comb pulses over the entire range of $\Delta t$ values applied.

FIG. 6B shows spectral placement of the comb pulses (centered at 200 THz) and the probe pulse (centered at 320 THz). The two comb pulses generate a degenerate a four-wave mixing (DFWM) signal that is detected in the usual FT-CARS approach. It is to avoid very strong coherent spike fluctuations in this signal that comb polarizations are set perpendicular in FT-CARS. However, the anti-Stokes signal of interest for FT-BCARS is shifted away from this spectral region, so is impervious to the coherent spike, allowing parallel polarization of the combs and providing 10× higher signal generation efficiency. The "resonant signal collected" in FIG. 6B represents the anti-Stokes signal of interest in FT-BCARS. Here, as in spectroscopic BCARS, the anti-Stokes light is generated by two distinct mechanisms and covers both the fingerprint and CH-stretch spectral regions. The two coherence-generating mechanisms are referred to "impulsive" and "2-color." The former is also operative in FT-CARS, where coherences in the fingerprint spectral region are generated with pump and Stokes fields from a single pulse. Here, however unlike FT-CARS, a ps pulse provides the probe field. In the 2-color mechanism, the ps pulse provides the pump and probe fields, and the comb provides only the Stokes field. Together, these two mechanisms broaden the range of coherences $C_{st,1}$ and $C_{st,2}$ into the CH-stretch region, and the signal over the spectral range (3 to 3000) cm$^{-1}$ can be obtained without the need for sub-10 fs pulses.

The time-domain expression for the FT-BCARS signal is similar to that of FT-CARS, but the two delta-function probe pulses can be replaced with a single-frequency probe field:

$$I_{FT-B}(\Delta t) \propto \int_{-\infty}^{\infty} |[C_{ST}(t) + C_{ST}(t - \Delta t)]E_{pr}|^2 dt \quad \text{Equation 11}$$

$$\propto 2C_{NR}^2 + 2C_{NR}C_R[2 + e^{r\Delta t}\cos(\Omega_R \Delta t)] + \quad \text{Equation 12}$$

$$C_R^2 \frac{(2\Gamma^2 + \Omega^2)(1 + e^{-r\Delta t}\cos(\Omega_R \Delta t)) - \Omega\Gamma e^{-r\Delta t}\sin(\Omega_R \Delta t))}{2\Gamma(\Gamma^2 + \Omega^2)}$$

Recognizing that typical values for $\Gamma$ and $\Omega$ are 0.3 THz and 30 THz respectively, the approximate substitution $(2\Gamma^2+\Omega^2) \approx (\text{Gamma}^2+\Omega^2) \approx \Omega^2$ in the purely resonant contribution can be made, reducing Equation 12 to:

$$I_{FT-B}(\Delta t) \propto 2C_{NR}^2 + 2C_{NR}C_R[2 + e^{-\Gamma\Delta t}\cos(\Omega_R\Delta t)] + C_R^2 [1+e^{-\Gamma\Delta t}\cos(\Omega_R\Delta t)]/2\Gamma \quad \text{Equation 13}$$

where it can be noted that the purely resonant term differs from the other terms in that it is divided by frequency (or, equivalently, multiplied by time.) This factor represents the effective time over which the signal is generated and collected. It is not explicit in the first two terms because they involve temporal delta-functions.

The expressions for FT-CARS and FT-BCARS in Equations 10 and 13 have important similarities and differences. The purely non-resonant and heterodyne terms have identical form in FT-CARS and FT-BCARS. The temporally long probe has little effect on the magnitude of the non-resonant signal because the non-resonant material coherence persists only for the duration of the short comb pulses (approximated by delta-functions here). By contrast, the purely resonant term differs between the two expressions in that it is divided by $2\Gamma$ in the FT-BCARS scheme. This reflects the duration over which the resonant signal is collected and is to be compared to the $\Gamma$ value for the comb pulses, which is implicitly included in the other terms. As mentioned above, the combs have a duration of $\approx 15$ fs (so, $\Gamma \approx 67$ THz), which is roughly 100 times larger than $\Gamma$ characteristic of vibrational resonances that appears in the last term of Equation 13. Thus, a 100-fold increase may be expected in the purely resonant signal in FT-BCARS compared to FT-CARS.

As with FT-CARS, the $\Delta t$-dependent anti-Stokes signal amplitude of FT-BCARS is simply Fourier transformed to yield the Raman spectrum. Here, however, the signal covers the (3 to 3000) cm$^{-1}$, range rather than just the fingerprint. Adding the picosecond probe pulse may intensify the purely resonant signal, but this will still typically be much smaller than the heterodyne contribution, and when it is not, the signal will transition from a linear concentration dependence (due to the heterodyne term) to a quadratic concentration dependence due to the purely resonant term.

dFT-BCARS Signal Detection

To the extent that the non-resonant material response is instantaneous, the non-resonant signal created by ultra-short comb-probe interactions has the same ultra-short (roughly 15 fs) duration at the detector, and thus can only heterodyne amplify the first 15 fs of the resonant signal generated during the same comb pulse interaction. In this case, the system fails to heterodyne amplify any of the increased signal intensity in the last term of Equation 13, so the increased signal may still be below the detection noise.

In spectroscopic BCARS, the non-resonant and resonant signals are stretched and overlapped in time when they are spectrally dispersed on to the CCD camera. In that approach, the heterodyne interaction lasts for the full duration of the material coherence, so all of the collected resonant signal is amplified. In this case, the heterodyne signal dominates, providing linear concentration dependence and high sensitivity.

As in spectroscopic BCARS, in FT-BCARS, the system can cause temporally distinct signal components to interact by spectrally dispersing on a multi-element detector and thus temporally stretching them. However, with FT-BCARS, the system is not constrained to use a multi-element detector as in spectroscopic BCARS because the FT-BCARS signal is encoded in the time domain. Instead, a single-element or few-element detector can be used.

The temporal behavior of distinct spectral signal components can be considered. The analysis can start by finding an expression for $\bar{C}_{st}(\Omega)$. This can be obtained as the Fourier transform of R(t) described in Equation 7, multiplied by the exciting field and convolved with the probe field in the frequency domain:

$$\tilde{P}_n(\omega; t_n) = \mathcal{F}\{\chi_{NR}^{(3)}\delta(t-t_n) + \chi_R^{(3)}\Theta_H(t-t_n)e^{i\Omega_R(t-t_n)}e^{-\Gamma_R(t-t_n)}\} \quad \text{Equation 14}$$

$$[E_S \star E_P](\Omega) * E_{pr}(\omega)$$

$$= \frac{\sigma_\omega}{2} Exp[-(\omega/(\sqrt{2}\sigma_\omega))^2 + it_n\omega]$$

$$\left[C_{NR} + \frac{C_R}{(\Gamma_R - i(\omega + \Omega_R))}\right]$$

where $\sigma_\omega$ characterizes the spectral width of and $t_n$ gives the arrival time of the n$^{th}$ comb pulse that provides the pump and Stokes fields for $\tilde{P}_n$.

If the signal is not dispersed on the detector, the temporal duration of nonresonant signal component is given by Exp $[-t^2/2\sigma_\omega^2]$. For $\sigma_\omega=25$ THz, the nonresonant signal field persists for about 15 fs. As discussed above, the resonant component will persist much longer because it is emitted continuously over the period of the probe pulse. If the pulse is spectrally dispersed, the nonresonant field component of each individual spot will have a temporal duration extended by roughly a factor N, the number of spectrally distinct spots created. In the time domain, expressions for the spectrally dispersed nonresonant and resonant field contributions at the detector are given as:

$$E_{NR}(t; k) \propto \frac{C_{NR}\sigma_\omega}{\sqrt{2}N}\cos(\omega_k t)\{\delta(t) * \exp[-(\sigma_\omega t/2N)^2]\} \quad \text{Equation 15}$$

$$E_R(t; k) \propto \frac{C_R\sigma_\omega}{\sqrt{2}}\exp^{(i\omega_k t)}\{\Theta_H(t)\exp^{-\Gamma_k t} * \exp[-(\sigma_\omega t/2N)^2]\} \quad \text{Equation 16}$$

where a factor N is present in the denominator of the expression for $E_{NR}$ but missing from the denominator of $E_R$ since $C_R$ is in its definition summed only over the specific resonance frequency, whereas $C_{NR}$ is defined as summed over all frequencies. Under this detection scheme, an electrical signal proportional to the modulus squared of the electric field at each spot is generated and these are all summed at the detector.

$$Sig \propto \sum_k^N \int_{-\infty}^{\infty} |E_1(t; k) + E_2(t - \Delta t, h)|^2 dt \quad \text{Equation 17}$$

Figure 7:
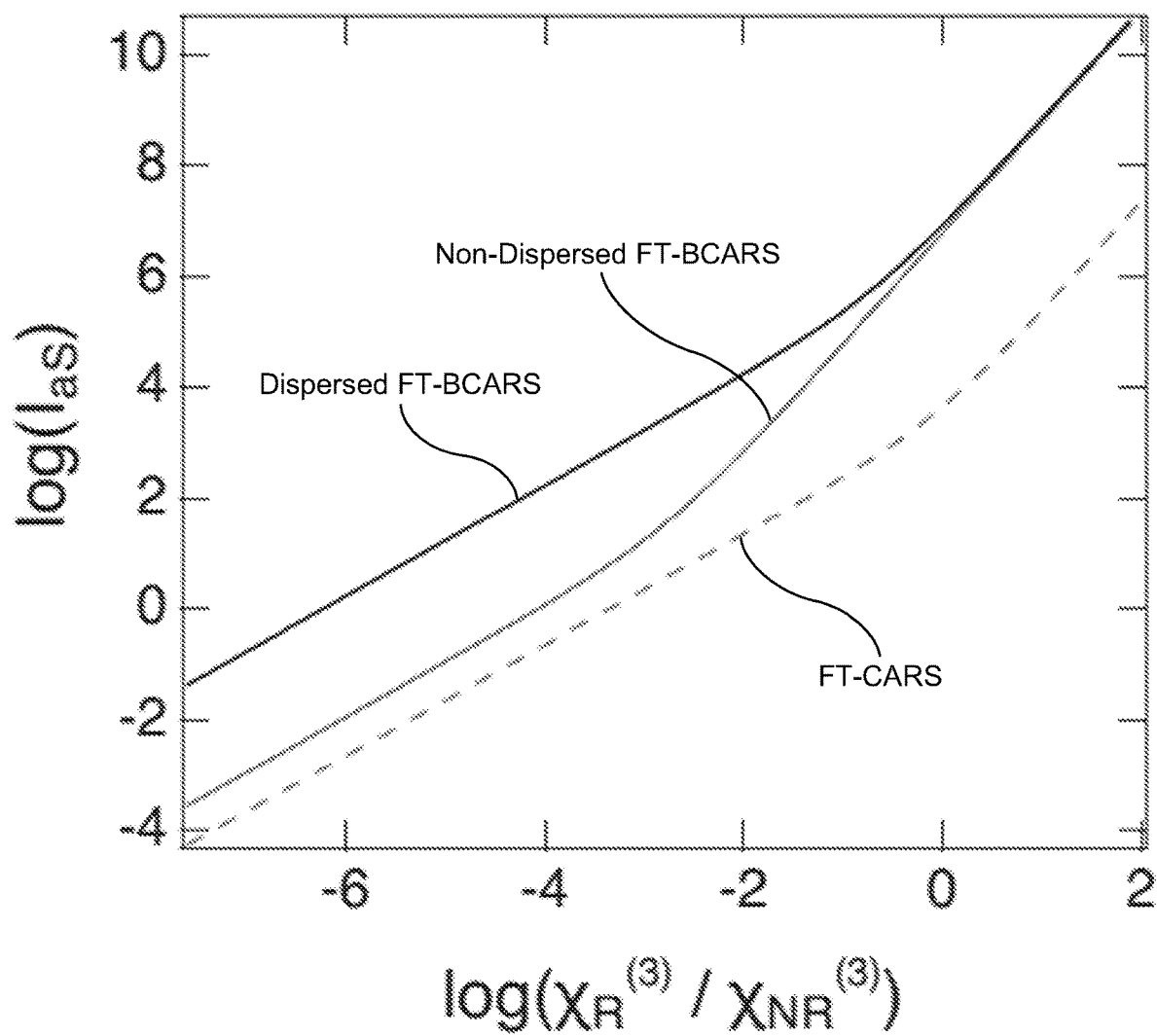
FIG. 7 depicts the results of testing a non-dispersed FT-BCARS and a dispersed FT-BCARS system.

FIG. 7 shows results of numerical integration of Equation 17 for N=1 (non-dispersed FT-BCARS) and N=1000 (dispersed FT-BCARS), as a function of the ratio $\chi_R^{(3)}/\chi_{NR}^{(3)}$.

The results for FT-CARS are also shown in the dashed line. In FT-CARS, the heterodyne and purely resonant terms have similar functional terms (see Equation 10). Thus, when $\chi_{NR}^{(3)} \gg \chi^{(3)}$, the heterodyne term dominates, and the signal is linear in $\lambda_R^{(3)}$. At larger values of $\chi_R^{(3)}$, the purely resonant term dominates, and the signal turns over to quadratic. For fingerprint spectra it is almost never the case that $\chi_R^{(3)} \gg \chi_{NR}^{(3)}$, and for all practical purposes, the signal can always be considered linear.

In the FT-BCARS scheme a blue-shifted ps laser pulse acts as the probe. This allows use of parallel-polarized comb pulses and to collect a much larger fraction of the anti-Stokes light. Together these factors lead to a 40-fold signal increase; however, this increase will generally be offset by a limit in the amount of light that can be used safely on the sample, and the fact that that light will be distributed between three pulses instead of two. Overall, the redistribution of light may lead to a reduction in signal by a factor of 2 to 10.

Example Use Cases

The following section provides example use cases for implementing the delay line architecture and optical techniques discussed above. The following examples are not limiting, but instead provide illustrations of how the systems and methods may be used and/or combined for optical techniques.

Referring again to FIGS. 1C and 1H, both examples show a delay module 100 for creating a delay line. A source 104 can provide an electric field such a light field 102. The light field 102 can be directed to a movable mirror 106a,b. Depending on the implementation, the movable mirror can be, for example, a planar galvanometer mirror (e.g., movable mirror 106a in FIG. 1C) or a polygonal mirror (e.g., movable mirror 106b in FIG. 1H). The movable mirror 106a,b can be rotatable upon an axis. In the case of the galvanometer movable mirror 106a, the rotation can be about an axis 107 running along the center of the movable mirror 106a such that the movable mirror 106a can rotate, or oscillate, side to side. In the case of the polygonal movable mirror 106b, the rotation can be about a rotational axis 116 running through a center point of the movable mirror 106b such that the movable mirror 106b can rotate, or spin, about the rotational axis 116.

In either case, e.g., the planar galvanometer mirror 106a or the polygonal mirror 106b, the direction of the incoming light field 102 can be redirected to the focusing element 108. The focusing element 108 be a single cylindrical mirror, as shown in FIGS. 1C and 1H, or it can be a plurality of cylindrical mirrors. The one or more cylindrical mirrors can, because of the one-dimensional concavity of their structure, have a focal axis 112 parallel to the length of the focusing element 108. This, of course, is a different structure than found in the spherical mirrors of the prior art which have two-dimensional concavity and a point focus rather than a focal axis. Although the focal axis 112 is shown placed upon the focusing element 108 in FIGS. 1C and 1H, it will be understood that the actual focus of the focusing element 108 is closer to the incoming light field 102. This enables the light field 102 to be received by the focusing element 108 and reflected back to a return mirror 110 along the focal axis 112. The return mirror 110 can be placed at the actual focal line of the focusing element 108, so that the line-focused beams reflected along the z-direction by the focusing element 108 are returned along the optical path.

The light field 102 can then be returned from the return mirror 110, to the focusing element 108, to the movable mirror 106a,b, and back to the source 104. The returned light field is now delayed with respect to the incoming light field 102. In some examples, the process of sending the light field through the delay module 100 can be repeated a plurality of times to extend a delay range and/or reduce aberrations.

Figure 8A:
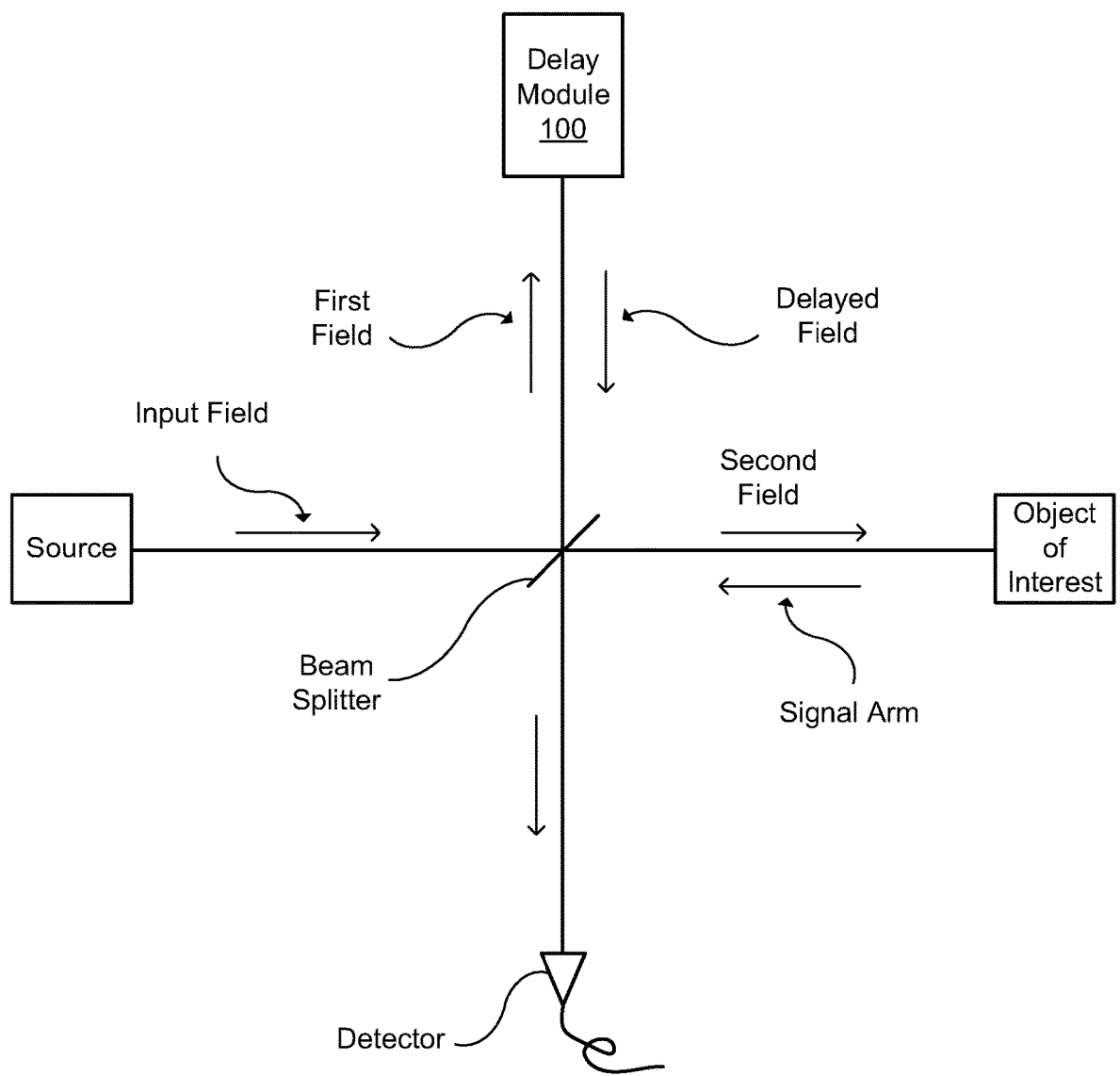
FIGS. 8A-8D are schematics for implementing a delay module, according to aspects of the present disclosure.

FIG. 8A is a schematic for implementing the example delay module 100 described above. In the configuration of FIG. 8A, an input field (e.g., the light field 102 described above) can be sent to a beam splitter. A portion of the split light field, e.g., the first light field, can be sent to the delay module 100. Another portion of the split light field, e.g., the second light field, can be directed to an object of interest. For example, the configuration in FIG. 8A can be used in LiDAR, wherein the object of interest is some distant reference target, in optical coherence tomography (OCT), wherein the object of interest includes the features of the retina, etc. After the second light field interacts with the object of interest, it is returned to the beam splitter, combined with the delayed line (which is delayed by the delay module 100), and analyzed. The present delay module 100 architecture enables rapid distance measurements (e.g., scan rates of greater than 40.0 kHz) with sub-micron resolution. This can be enabled by the reduction of aberrations by using the focusing element 108 and by changing the geometry of the movable mirrors 106a,b over the prior art designs.

Figure 8B:
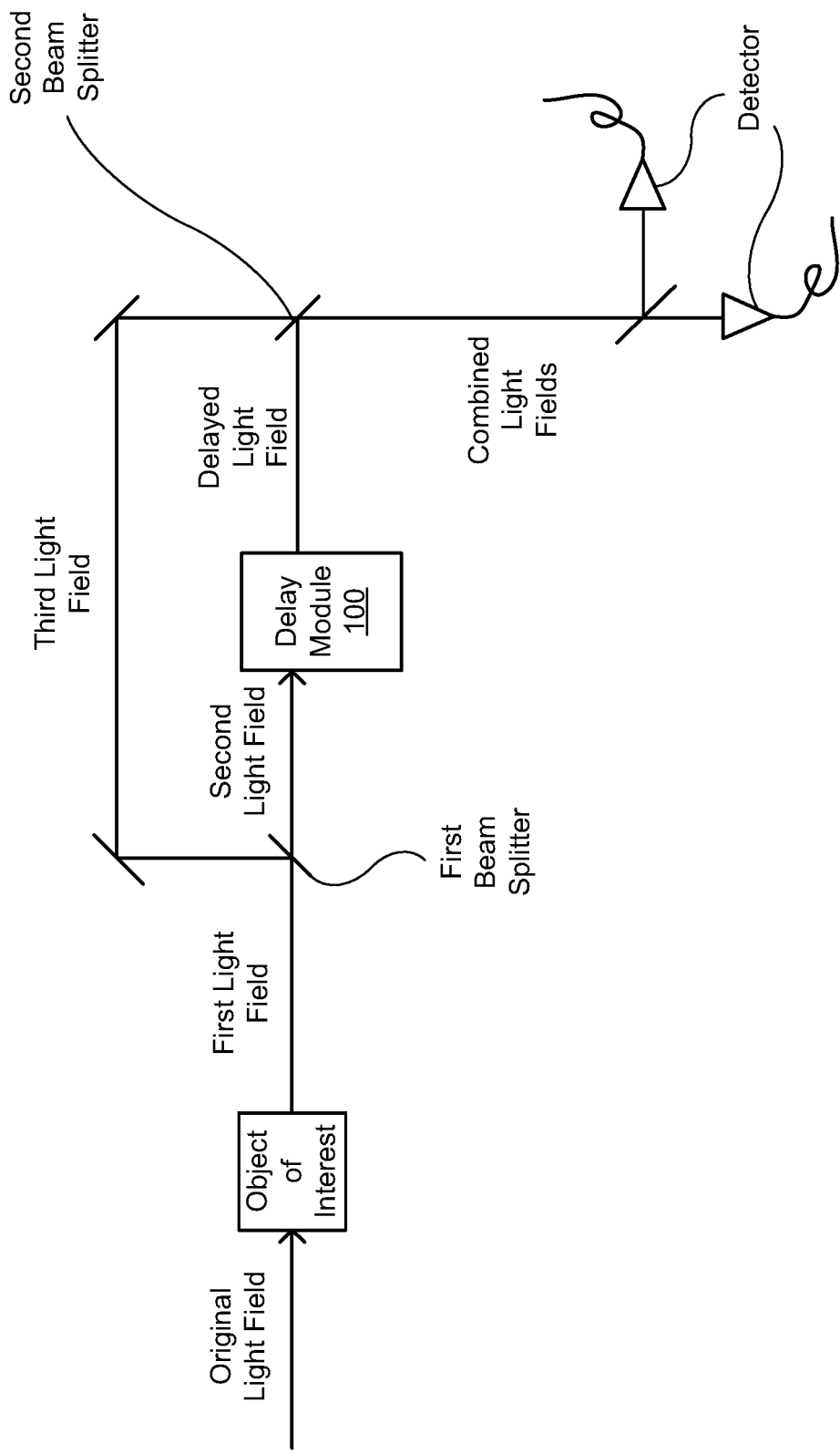

FIG. 8B is a diagram of using the delay module 100 in a signal auto-correlation technique. An original light field can be directed to an object of interest. A first light field is then created after the original light field passes through or is scattered by the object of interest, thereby creating a first light field with new spectral frequency content compared to the original light field. The first light field can then be collected and directed to a first beam splitter such that the first light field is split into the second light field and a third light field. The second light field then passes through the delay module 100, as described above, to create the delayed light field. The delayed light field is recombined with the third light field to create combined light fields. The combined light fields can then be directed to one or more detectors and analyzed. For example, a frequency-dependent amplitude of the combined light fields can be determined based on a delay between the delayed light field and the third light field. In these examples, the signal field (i.e., the second light field in the figure) uses itself as a local oscillator.

The original light field can be an optical pulse with spectral content of greater than 200 wavenumbers, for example from approximately 200 to approximately 3500 wavenumbers. The first and third light fields can be detected at optical frequencies higher than those in the original light field, for example in the case of anti-Stokes scattering. In other examples, the delayed and third light fields can be detected at optical frequencies lower than those in the original light field, for example in the case of Stokes scattering.

In some examples, the original light field can be a combination of two light fields, for example a first original light field and a second original light field. The first original light field and the second original light field can be combined co-linearly and coincidentally in time prior to passing through the first beam splitter. The first original light field can be an optical pulse with spectral content of greater than 200 wavenumbers; the second original light field can be an optical pulse with spectral content of less than 30 wavenumbers. The delayed and third light fields can be detected at optical frequencies higher than those in the original light field, for example in the case of anti-Stokes scattering. In other examples, the delayed and third light fields can be detected at optical frequencies lower than those in the original light field, for example in the case of Stokes scattering.

In some examples, the combined light fields can be detected along their primary polarization direction. The physics of waves is such that, when light of the same frequency and polarization is combined into a single optical mode, (such as is the case when applying interferometric detection methods) it may be necessary that the light have at least two alternative paths along which to propagate after combination. For two incoming light fields of the same energy, with two fields emerging after combination, the two emerging fields vary in energy between zero and the sum of the incoming field energies depending on the phase (i.e., the path length) difference between the two incoming light fields. The total energy in the light propagating along both post-combination paths is equal to the sum of the energies of the two incoming light fields (minus any losses in the combining optics). By measuring the light energy in one post-combination path, it is possible to detect oscillations in the signal that contain information about the phase and amplitude of light frequency components that are common to both incoming fields. These single-path measurements are convenient in that they can be done with only one detector. However, amplitude noise that is difficult to reject can be introduced by intensity fluctuations in the incoming light fields.

Another approach is to detect both paths simultaneously, but on different detectors. By doing this, one can compute the difference between, and sum of, the two detector signals, and divide the former by the latter. In doing this, one obtains a normalized difference signal that is impervious to source light field fluctuations. To this end, the combined light fields can be separately and simultaneously detected at +45 degrees and at −45 degrees with respect to their primary polarization direction.

Figure 8C:
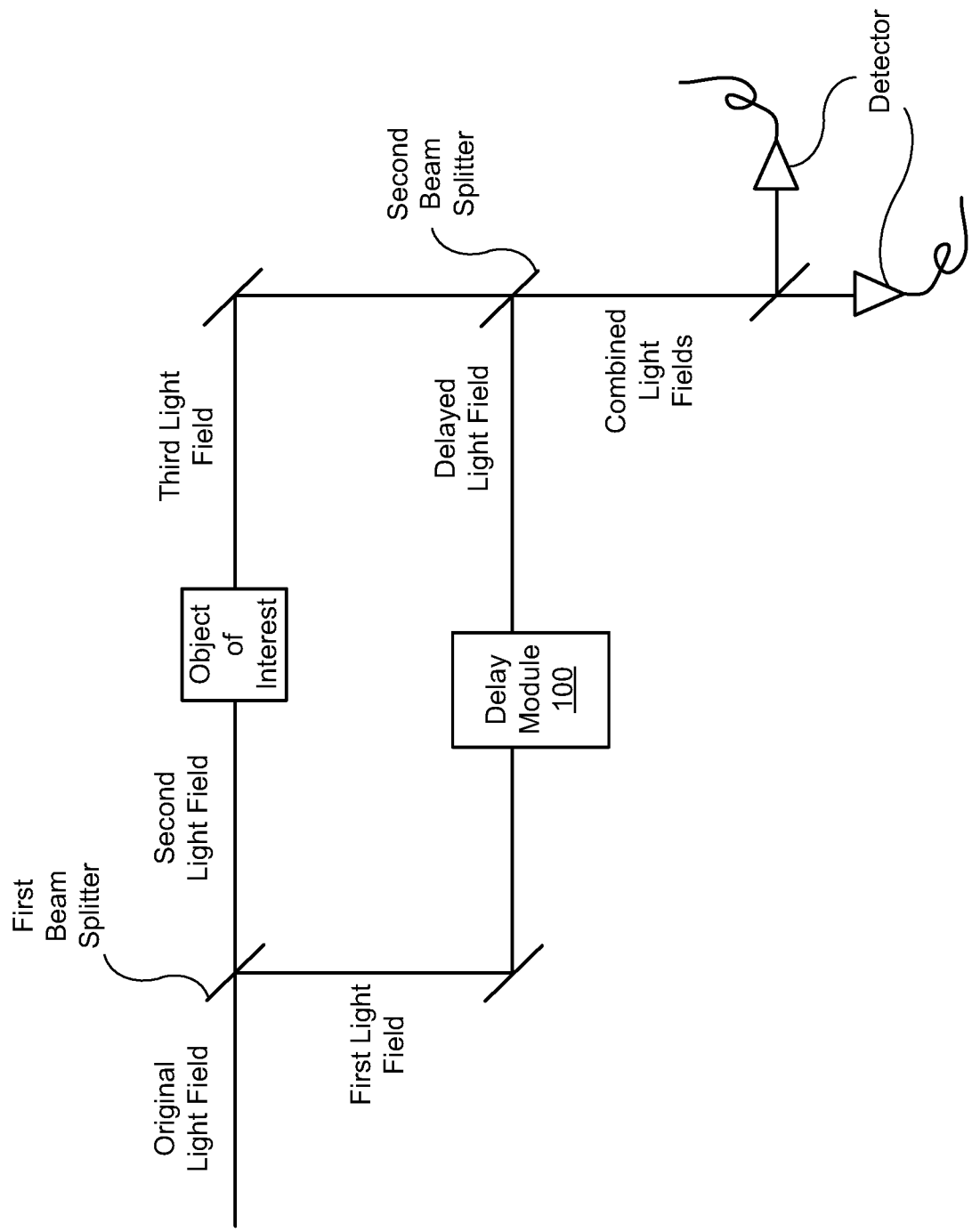

FIG. 8C is a diagram of using the delay module 100 in a cross-correlation technique. An original light field can be directed across a first beam splitter such that the original light field is split into the first light field and a second light field. The first light field then passes through the delay module 100, as described above, to create the delayed light field. The second light field can be directed to an object of interest thereby creating a third light field having a different spectral phase or frequency content than the second light field. The third light field can be collected and combined with the delayed light field at a second beam splitter, thereby creating combined light fields. The combined light fields can be directed onto one or more detectors and analyzed. The component of the delayed light field that is combined with the third light field at the second beam splitter is referred to as the local oscillator. For example, the frequency-dependent amplitude of the third light field can be determined based on a delay between the delayed light field and the third light field. In these examples, the local oscillator component of the delayed light field can originate before or after the first beam splitter.

The original light field can be an optical pulse with spectral content of greater than 200 wavenumbers, for example from approximately 200 to approximately 3500 wavenumbers. The third light field can be detected at optical frequencies higher than those in the original light field, for example in the case of anti-Stokes scattering. In other examples, the third light field can be detected at optical frequencies lower than those in the original light field, for example in the case of Stokes scattering.

In some examples, the original light field can be a combination of two light fields, for example a first original light field and a second original light field. The first original light field and the second original light field can be combined co-linearly and coincidentally in time prior to passing through the first beam splitter. The first original light field can be an optical pulse with spectral content of greater than 200 wavenumbers; the second original light field can be an optical pulse with spectral content of less than 30 wavenumbers. The third light field can be detected at optical frequencies higher than those in the original light field, for example in the case of anti-Stokes scattering. In other examples, the third light field can be detected at optical frequencies lower than those in the original light field, for example in the case of Stokes scattering.

In some examples, the combined light fields can be detected along their primary polarization direction. In other examples, the combined light fields can be separately and simultaneously detected at +45 degrees and at −45 degrees with respect to their primary polarization direction.

Figure 8D:
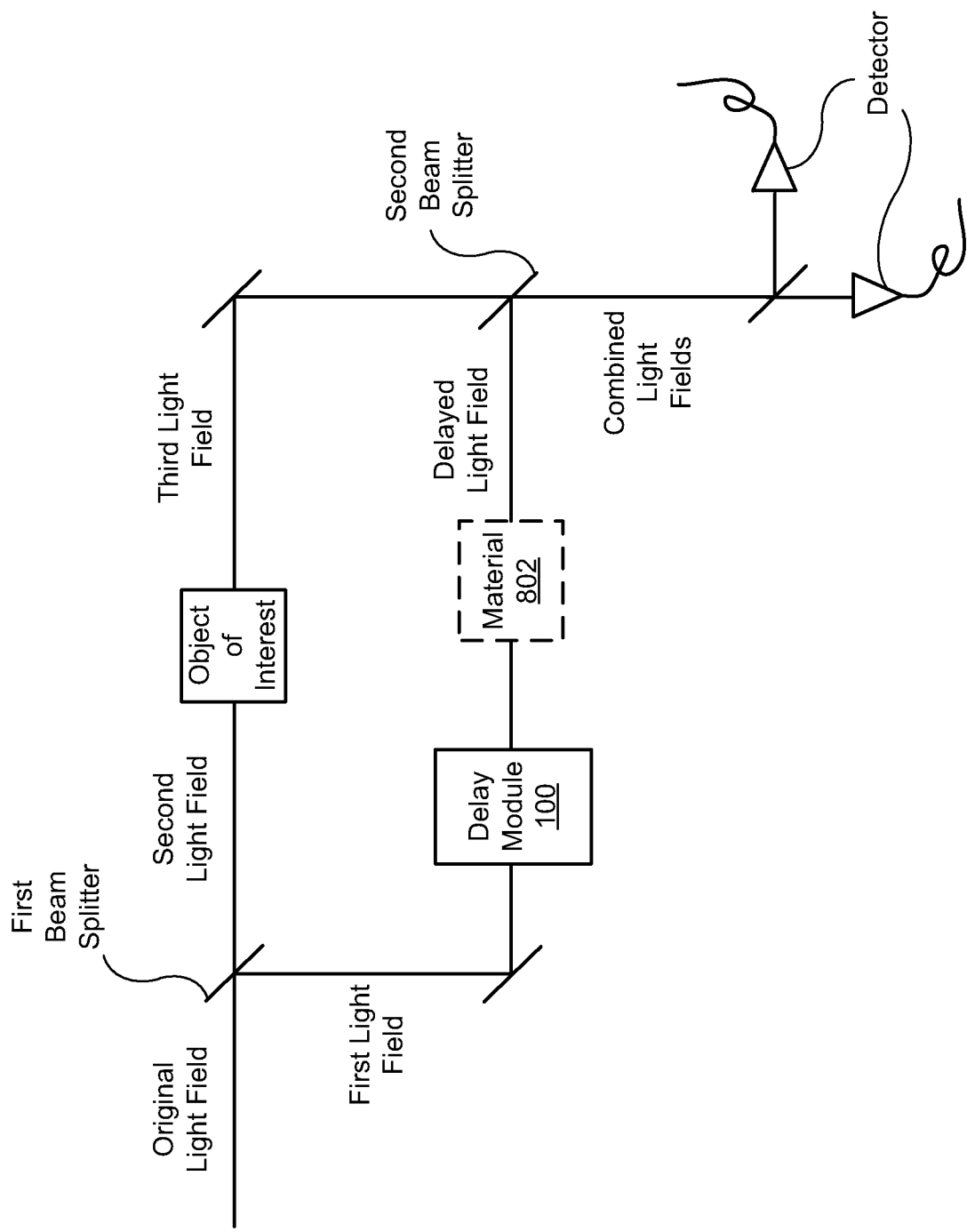

FIG. 8D is a diagram of implementing the example in FIG. 8C, i.e., the cross-correlation technique, with a material 802 in line with the delayed light field to generate the local oscillator portion of the delayed light field that has the same frequency components as the third light field (i.e., the field crated by interacting with the object of interest). The material 802 can be placed in line with the delayed light field such that the frequency of the delayed light field is altered prior to combining with the third light field. The material 802 would preferentially be a material with a strong inelastic scattering cross-section or a high optical nonlinearity (e.g., large $\chi^{(3)}$) wherein interaction with the first light field would generate light at new colors (i.e., at new frequency components).

In another alternative, instead of the material 802 being placed in line with the delayed light field, the original light field can contain the same frequencies as the third light field, and thus the local oscillator field. The first beam splitter can be dichroic, thereby separating a frequency of the first light field from a frequency of the original light field that are common to the third light field (the local oscillator).

Figure 9A:
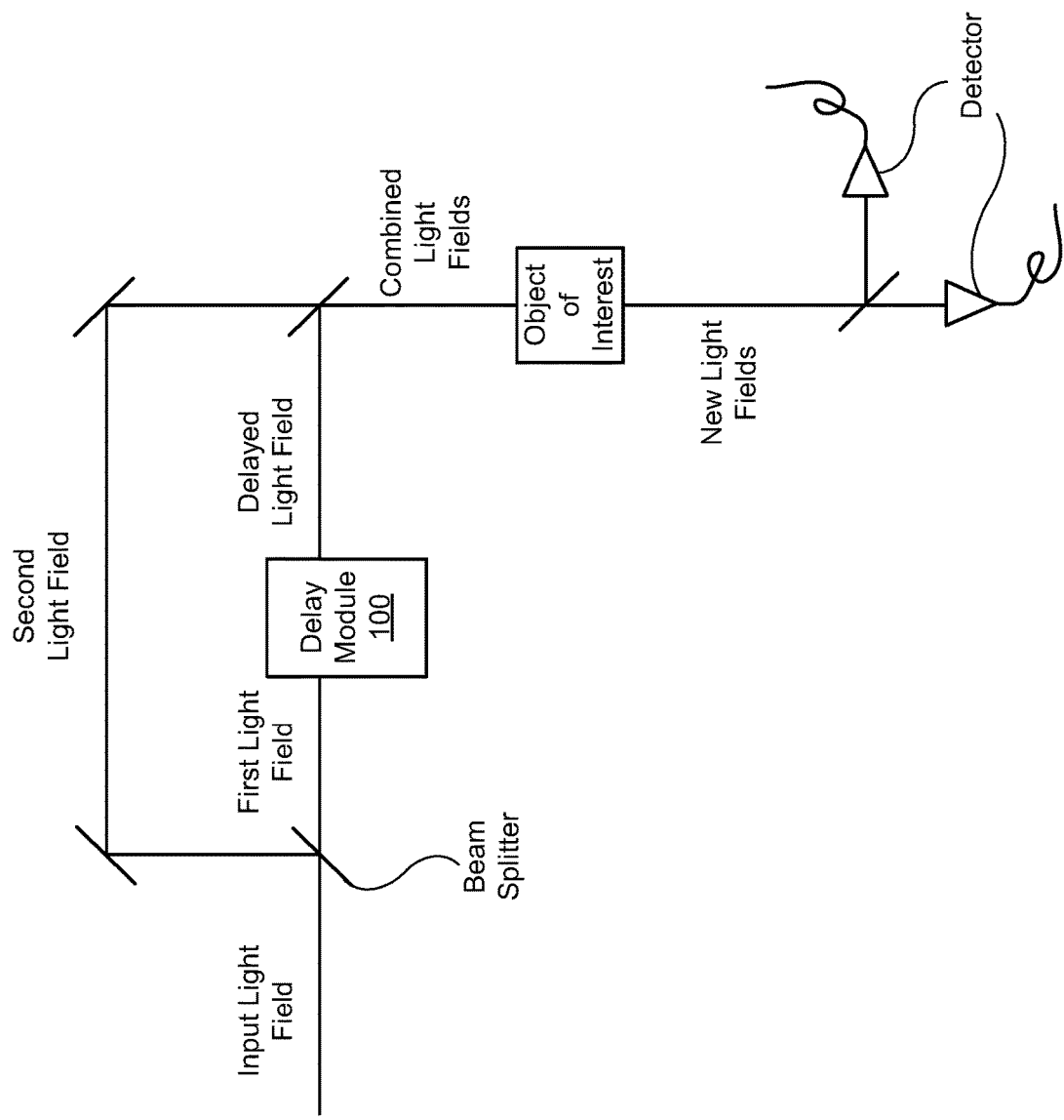
FIGS. 9A and 9B are schematics for implementing fingerprint coherent Raman microscopy, according to aspects of the present disclosure.

FIG. 9A is a schematic for implementing the example delay module 100 described above. In the configuration of FIG. 9A, multiple fields can interact with an object of interest, and at least one of the fields can be delayed in time with respect to the other. This example configuration can be used to implement fingerprint coherent Raman microscopy systems and methods. An input light field (e.g., the light field 102 described above) can be sent to a beam splitter. A portion of the split field, e.g., the first light field, can be sent to the delay module 100. Another portion of the split field, e.g., the second light field, can be directed to a fixed mirror, such that the second field is not delayed. The non-delayed second light field can be combined with the delayed light field to create combined light fields. The combined light fields can be directed across an object of interest, thereby creating one or more new light fields with spectral frequency content. As described above, BCARS and other fingerprint coherent Raman microscopy techniques can be used to analyze biological samples or material samples. To this end, the object of interest can be a biological sample or material sample in these examples. The one or more new light fields created by interaction with the object of interest can be directed onto one or more detectors and analyzed. For example, a frequency-dependent phase and/or amplitude of the one or more new light fields can be determined based on a delay between the delayed light field and the second light field.

The first light field and the second light field can be optical pulses with spectral content of greater than 200 wavenumbers. The one or more new light fields can be detected at higher optical frequencies than the delayed light field and the second light field, for example in anti-Stokes scattering. In other examples, the one or more new light fields can be detected at lower optical frequencies than the delayed light field and the second light field, for example in Stokes scattering.

Figure 9B:
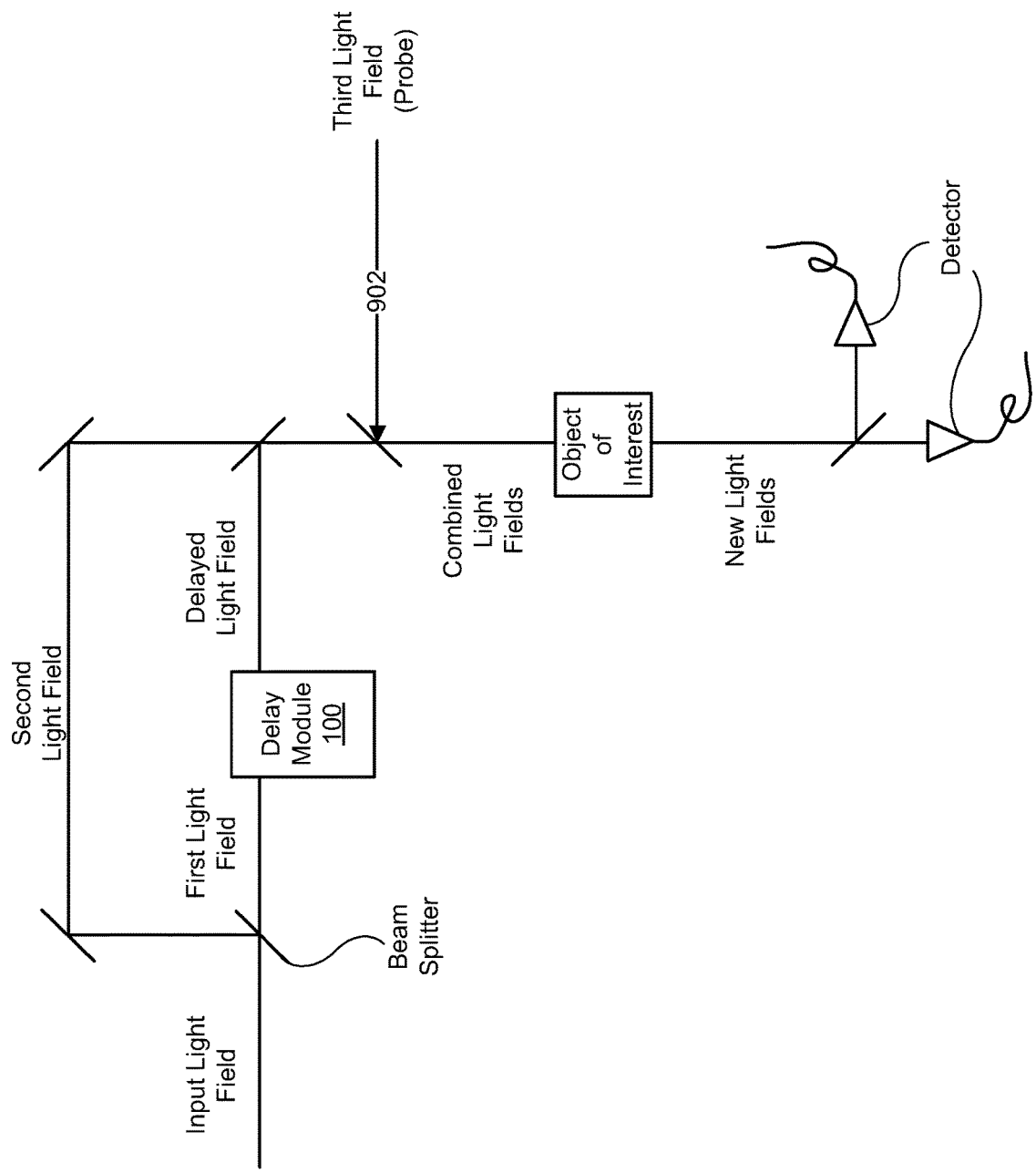

FIG. 9B is another example that can be used for fingerprint coherent Raman microscopy. The example shown in FIG. 9B is similar to the example shown in FIG. 9A. In this example, however, a third light field 902 can be applied to the second light field. The third light field 902 can be an optical pulse with spectral content of less than 30 wavenumbers, and can be fixed in time with the second (non-delayed) light field. The combination of the delayed light field, the second light field, and the third light field 902 can create one or more new light fields after interacting with an object of interest, and the one or more new light fields can then be analyzed.

As described above, the third light field 902 can be a picosecond pulse that acts as the probe in the dFT-BCARS examples described above. This picosecond pulse is shown as picosecond pulse 504 in FIG. 5. The first light field and the second light field can be femtosecond pulses, shown in FIG. 5 as first femtosecond pulse 502a and second femtosecond pulse 502b. When the third light field 902 is several picoseconds in duration, the third light field 902 can be present during both the second light field pulse and the delayed light field pulse.

It should be noted that, although FIGS. 9A and 9B show example systems using the delay module 100 described above, the delayed light field that is combined with the second light field in these examples can be created by any other system or method. As will be appreciated, the dFT-BCARS systems and methods described above can utilize any method of delaying one of the two fields that enter the object of interest, and the utility of the dFT-BCARS design is not limited to using the delay module 100 defined above.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method comprising:
   directing an input light field across a beam splitter such that the input light field is split into a first light field and a second light field;
   directing the first light field to a delay module;
   delaying the first light field via the delay module to create a delayed light field;
   combining a third light field with the second light field and the delayed light field to create combined light fields;
   directing the combined light fields across an object of interest, thereby creating one or more new light fields with new spectral frequency content;
   directing one or more of the new light fields onto one or more detectors after transmission through or scattering from the object of interest; and
   determining a frequency-dependent phase and/or amplitude of one or more of the new light fields based on a delay between light fields of the combined light fields;
   wherein the third light field is an optical pulse with spectral content of less than 30 wavenumbers and being fixed in time with the second light field; and
   wherein either:
      the one or more new light fields are detected at higher optical frequencies than the third light field; or
      the one or more new light fields are detected at lower optical frequencies than the third light field.

2. The method of claim 1, wherein:
   the delay module comprises:
      a movable mirror;
      a focusing optical element having a focal axis parallel to its length; and
      a return mirror;
   the movable mirror is configured to receive the first light field and reflect the first light field to the focusing optical element;
   the focusing optical element is configured to receive the first light field reflected from the movable mirror and return the first light field to the return mirror; and
   the return mirror is configured to receive the first light field reflected from the focusing optical element and reflect the first light field back to the focusing optical element.

3. The method of claim 2, wherein:
   the movable mirror is a planar galvanometer mirror rotatable upon an axis; and
   the method further comprises rotating the movable mirror upon the axis to direct the first light field toward the focusing optical element.

4. The method of claim 2, wherein:
   the movable mirror is a polygonal mirror rotatable around a rotational axis; and
   the method further comprises rotating the movable mirror around the rotational axis to direct the first light field toward the focusing optical element.

5. The method of claim 1 further comprising repeating the directing of the first light field to the delay module and delaying the first light field via the delay module to create the delayed light field to extend a delay range and/or reduce aberrations.

6. The method of claim 1 further comprising calculating a complex refractive index of the object of interest based on optical interference between the delayed light field and the combined light fields after the combined light fields interact with the object of interest.

7. The method of claim 1, wherein:
the first light field and the second light field are optical pulses with spectral content of greater than 200 wavenumbers; and either
the one or more new light fields are detected at higher optical frequencies than the delayed light field and the second light field; or
the one or more new light fields are detected at lower optical frequencies than the delayed light field and the second light field.

8. The method of claim 1 further comprising:
combining another light field containing the same frequency components as the one or more new light fields; and
constituting a local oscillator with any of the light fields previous to detection.

9. The method of claim 1 further comprising detecting, at one or more of the detectors, one or more of the new light fields along their primary polarization direction.

10. The method of claim 1 further comprising detecting one or more of the new light fields at one or more of the detectors;
wherein one or more of the new light fields are separately and simultaneously detected at +45 degrees and at −45 degrees with respect to their primary polarization direction.

11. A method comprising:
directing an original light field across a first beam splitter such that the original light field is split into a first light field and a second light field;
delaying the first light field to create a delayed light field;
directing the second light field across an object of interest, thereby creating a third light field having new spectral frequency components compared to the second light field;
collecting the third light field after the second light field scatters from the object of interest and/or after the second light field transmits through the object of interest;
directing the delayed light field into a material to generate a portion of the delayed light field having the same frequency components as the third light field;
combining the third light field with the portion of the delayed light field having the same frequency components as the third light field in a second beam splitter, thereby creating combined light fields;
directing the combined light fields onto one or more detectors; and
determining a frequency-dependent phase and/or amplitude of the combined light fields based on a delay between the delayed light field and the second light field.

12. The method of claim 11, wherein:
the original light field contains the same frequencies as the third light field; and
the first beam splitter is dichroic, thereby separating a frequency of the first light field from a frequency of the original light field that are common to new frequency components of the third light field.

13. The method of claim 11, wherein:
the original light field is an optical pulse with spectral content of greater than 200 wavenumbers; and either
the third light field is detected at optical frequencies higher than those in the second light field; or
third light field is detected at optical frequencies lower than those in the second light field.

14. The method of claim 11, wherein:
the original light field is a combination of a first original light field and a second original light field;
the first original light field and the second original light field are combined co-linearly and coincidentally in time;
the first original light field is an optical pulse with spectral content of greater than 200 wavenumbers;
the second original light field is an optical pulse with spectral content of less than 30 wavenumbers; and either
the third light field is detected at optical frequencies higher than those in the second light field; or
the third light field is detected at optical frequencies lower than those in the second light field.

15. The method of claim 11, wherein the combined light fields are detected along their primary polarization direction.

16. The method of claim 11, wherein:
the combined light fields are separately and simultaneously detected at +45 degrees and at −45 degrees with respect to their primary polarization direction.

17. A method comprising:
directing an original light field across an object of interest, thereby creating a first light field with new spectral frequency content compared to the original light field;
collecting the first light field after it scatters from the object of interest or after it transmits through the object of interest;
directing the first light field across a first beam splitter such that the first light field is split into a second light field and a third light field;
delaying the second light field to create a delayed light field;
combining the delayed light field and the third light field in a second beam splitter to create combined light fields;
directing the combined light fields onto one or more detectors; and
determining a frequency-dependent amplitude of the combined light fields based on a delay between the delayed light field and the third light field;
wherein the second light field and the third light field are separately and simultaneously detected at +45 degrees and at −45 degrees with respect to their primary polarization direction.

18. The method of claim 17, wherein the original light field is an optical pulse with spectral content of greater than 200 wavenumbers; and either
the second and third light fields are detected at optical frequencies higher than those in the original light field; or
the second and third light fields are detected at optical frequencies lower than those in the original light field.

19. The method of claim 17, wherein:
the original light field is a combination of a first original light field and a second original light field;
the first original light field and the second original light field are combined co-linearly and coincidentally in time;
the first original light field is an optical pulse with spectral content of greater than 200 wavenumbers;

the second original light field is an optical pulse with spectral content of less than 30 wavenumbers; and either
the second and third light fields are detected at optical frequencies higher than those in the original light field; or
the second and third light fields are detected at optical frequencies lower than those in the first light field.

20. The method of claim 17, wherein the second light field and the third light field are detected along their primary polarization direction.

21. A system comprising:
a delay module configured to delay a first light field to create a delayed light field;
a detector configured to combine a second light field with the delayed light field after the second light field interacts with an object of interest; and
a processor;
wherein the delay module comprises:
a movable mirror;
a focusing optical element having a focal axis perpendicular to a movement direction of the movable mirror; and
a return mirror;
wherein the movable mirror is configured to receive the first light field and vary a path length of the first light field as the movable mirror moves;
wherein the movable mirror is further configured to reflect the first light field to the focusing optical element along a direction that is out of a plane of motion of the first light field;
wherein the focusing optical element is configured to receive the first light field reflected from the movable mirror and focus the first light field on the return mirror;
wherein the focal axis of the focusing optical element is perpendicular to a movement of light so that the first light field remains focused on the return mirror with minimum aberration throughout a range of the first light field motion, even though first light field is reflected from the movable mirror to the return mirror in a direction out of the plane of motion of the first light field;
wherein the return mirror is configured to receive the first light field reflected from the focusing optical element and reflect the first light field back to the focusing optical element; and
wherein the processor is configured to calculate a complex refractive index of the object of interest based on optical interference between the delayed light field and the second light field after the second light field interacts with the object of interest.

22. The system of claim 21 further comprising:
a light field source configured to provide an input light field; and
a beam splitter configured to split the input light field into the first light field and the second light field;
wherein:
the movable mirror is rotatable upon an axis;
the movable mirror is positioned such that the movable mirror intersects the focal axis of the focusing optical element;
the return mirror is positioned such that the return mirror intersects the focal axis of the focusing optical element; and
the first light field approaches the delay module along a line which is a linear combination of the axis of the movable mirror and the focal axis of the focusing optical element.

23. The system of claim 21, wherein the focusing optical element is a cylindrical mirror;
wherein the movable mirror is selected from the group consisting of a planar galvanometer mirror and a polygonal mirror; and
the system has a scan rate of greater than 1.0 kHz.

24. The system of claim 23 having a scan rate of greater than 40.0 kHz.

25. A method comprising:
directing an input light field across a beam splitter such that the input light field is split into a first light field and a second light field;
delaying the first light field with respect to the second light field, thereby creating a delayed light field;
combining a third light field with the second light field and the delayed light field to create combined light fields, the third light field being an optical pulse with spectral content of less than 30 wavenumbers and being fixed in time with the second light field;
directing combined light fields across an object of interest, thereby creating one or more new light fields with new spectral frequency content;
directing one or more of the new light fields onto one or more detectors after transmission through or scattering from the object of interest; and
determining a frequency-dependent phase and/or amplitude of one or more of the new light fields based on a delay between light fields of the combined light fields.

26. The method of claim 25, wherein delaying the first light field with respect to the second light field comprises directing the first light field to a delay module, the delay module comprising:
a movable mirror;
a focusing optical element having a focal axis parallel to its length; and
a return mirror;
wherein the movable mirror is configured to receive the first light field and reflect the first light field to the focusing optical element;
wherein the focusing optical element is configured to receive the first light field reflected from the movable mirror and return the first light field to the return mirror; and
wherein the return mirror is configured to receive the first light field reflected from the focusing optical element and reflect the first light field back to the focusing optical element.

27. The method of claim 26, wherein:
the movable mirror is rotatable upon an axis;
the movable mirror is positioned such that the movable mirror intersects the focal axis of the focusing optical element;
the return mirror is positioned such that the return mirror intersects the focal axis of the focusing optical element;
the first light field approaches the delay module along a line which is a linear combination of the axis of the movable mirror and the focal axis of the focusing optical element; and
the method further comprises rotating the movable mirror upon the axis to direct the first light field toward the focusing optical element.

28. A method comprising:
directing a first light field across an object of interest;
creating a delayed light field by:
- passing a second light field through a beam splitter to create a third light field; and
- directing the third light field to a movable mirror, to a cylindrical mirror having a focal axis parallel to a length of the cylindrical mirror, and to a return mirror;

directing the delayed light field across the object of interest;
directing a picosecond probe light field across the object of interest;
creating a signal field with the first light field, the delayed light field, and the picosecond probe light field after the first light field, the delayed light field, and the picosecond probe light field interact with the object of interest; and
analyzing the signal field with a broadband coherent anti-Stokes Raman scattering technique after applying delay on the delayed light field.

29. The method of claim 28 further comprising:
dispersing the signal field before applying it onto a single-element or multi-element detector;
varying timing of the delayed light field; and
recovering signal oscillations based on a variation of the delayed light field.

* * * * *